US012545001B2

(12) United States Patent
Herrin

(10) Patent No.: US 12,545,001 B2
(45) Date of Patent: Feb. 10, 2026

(54) APPARATUS AND METHOD FOR OPTIMIZED CONTAINER CONSTRUCTION

(71) Applicant: Robert M. Herrin, Orlando, FL (US)

(72) Inventor: Robert M. Herrin, Orlando, FL (US)

( * ) Notice: Subject to any disclaimer, the term of this patent is extended or adjusted under 35 U.S.C. 154(b) by 0 days.

(21) Appl. No.: 19/066,247

(22) Filed: Feb. 28, 2025

(65) Prior Publication Data

US 2025/0387994 A1 Dec. 25, 2025

Related U.S. Application Data

(60) Provisional application No. 63/662,539, filed on Jun. 21, 2024.

(51) Int. Cl.
*B31B 50/04* (2017.01)
*B31B 50/64* (2017.01)
*B31B 120/30* (2017.01)

(52) U.S. Cl.
CPC ............ *B31B 50/642* (2017.08); *B31B 50/04* (2017.08); *B31B 2120/30* (2017.08)

(58) Field of Classification Search
CPC ... B31B 50/642; B31B 2120/30; B31B 50/04; B31B 50/624; B65B 65/02
See application file for complete search history.

(56) References Cited

U.S. PATENT DOCUMENTS 5,063,726 A * 11/1991 Boisseau ............... B31B 50/626 53/376.5
6,226,965 B1 * 5/2001 Lam ........................ B65B 51/02 493/333
9,027,315 B2 * 5/2015 Tsutsumi .............. B65B 43/305 53/381.1
11,273,939 B2 * 3/2022 Fox ....................... B31B 50/802
11,492,163 B2 * 11/2022 Menta ................... B65B 59/005
2010/0263333 A1 * 10/2010 Langen .................... B65D 5/02 53/563
2019/0329515 A1 * 10/2019 Davis .................... B31B 50/624

* cited by examiner

*Primary Examiner* — Andrew M Tecco
*Assistant Examiner* — Nicholas E Igbokwe
(74) *Attorney, Agent, or Firm* — Andrew Behrens; Trenam Law

(57) ABSTRACT

The disclosed invention relates to a system and method for forming case assemblies, particularly half-slotted containers (HSCs), through an automated process. The system includes an assembly frame supporting multiple subsystems: a knock-down flat (KDF) dispenser, conveyors, an opening and folding assembly, a compression assembly, and an embedding assembly. The KDF dispenser supplies flat-packed container components to the conveyors, which transport them through the stages of the process. The opening and folding assembly opens and folds panels of the first KDF, applying adhesive to the minor panels. The compression assembly seals the folded panels, forming a base. The embedding assembly aligns and nests the sealed first KDF into a second KDF, creating a reinforced container. The system is equipped with a control module for automated operation and adjustable parameters, allowing compatibility with various container sizes and configurations. The process reduces manual labor and enhances efficiency in packaging applications.

7 Claims, 27 Drawing Sheets

APPARATUS AND METHOD FOR OPTIMIZED CONTAINER CONSTRUCTION

CROSS-REFERENCE TO RELATED APPLICATIONS

This nonprovisional application claims the benefit of U.S. Provisional Application No. 63/662,539 entitled "METHOD AND APPARATUS FOR ERECTING, SEALING AND STUFFING CONTAINERS" filed on Jun. 21, 2024, by the same inventor, which is incorporated herein by reference, in its entirety, for all purposes.

BACKGROUND OF THE INVENTION

1. Field of the Invention

This invention relates, generally, to assembly apparatuses. More specifically, it relates to an apparatus and method for constructing and sealing corrugated boxes and half-slotted containers.

2. Brief Description of the Prior Art

In the corrugated box industry, the containers or cases are manufactured at a high production rate and are packaged in small manageable bundles and palletized for shipment. To reduce shipping costs, these containers are manufactured as knocked down flats ("KDFs") and shipped to their final destination. Upon delivery of the containers to the packer, the KDFs must be opened, and the end flaps need to be sealed with glue or taped prior to packing the products to be shipped inside. This practice minimizes storage and logistics costs but places a significant burden on the packers, who must perform additional steps before filling the boxes with the desired products. The complexity increases further in industries such as produce where boxes must maintain high structural integrity to protect goods during stacking and transportation.

In the produce industry, most volume packers utilize half-slotted containers (HSCs). HSCs introduce a unique challenge in box preparation and the packing industry. A HSC has flaps on one end and is open on the other end. HSCs are used to fabricate a two-piece container, with an inside part and an outside part. One of the HSCs is flipped upside down and telescoped within the other HSC. Each part has flaps that are folded and sealed to form the top and the bottom. This configuration results in a telescoping assembly with double-layered vertical sides to provide column strength. This column strength is necessary to be able to stack and ship the produce without damage. The preparation of HSCs includes multiple steps which could introduce a plurality of errors that could slow down the packing process. Any errors in this process could potentially compromise box stability, lead to jams, product loss, or damage during transport.

The preparation of the HSC prior to the presentation of the container to the automated packer includes erecting (opening up) a first KDF and a second KDF to be used as the inside and/or outside part of the HSC. In some embodiments, the bottom of the first KDF is sealed, and the first KDF is then stuffed into the second KDF to form the HSC. In this manner, the automated packing of products requires the presentation of first KDF to the automated packer with one half of the first KDF open (i.e., unsealed) to allow for embedding the product into the second KDF forming the HSC. A taper sealing device or top sealer is then used downstream of the automated packing machines to provide the final closing of the container.

A lack of skilled labor and the high cost of labor have motivated many packers to move toward automation and, as a result, the automated packing of produce and other products is increasing. These processes, once performed efficiently by experienced operators, now encounter delays and inconsistencies as companies struggle to recruit and retain personnel. The packing machines use a combination of count, size, and weight to determine the fill of the box. There are also products, such as citrus and eggs, which use "pick and place" method machinery to emulate manual packing. As a result, automated systems are viewed as the only solution to improve efficiency, reduce costs, and ensure consistency in packaging.

The automated erector-sealer-stuffer machines currently known in the art are excessively large, expensive, and require two or more operators. Existing automated erector-sealer-stuffer machines used in the industry occupy an excessively large footprint, often requiring more than 300 square feet of floor space. This is a major issue for facilities where floor space is limited or shared with other operations. Companies find it difficult to scale their production or optimize workflows often struggle to accommodate these large machines without costly reconfiguration. As the demand for automation increases, the need for compact solutions that can fit seamlessly into modem production lines becomes a major factor. A system that streamlines tasks such as KDF loading, flap folding, and compression while minimizing operator intervention would provide a more practical solution for industries facing labor constraints.

Accordingly, what is needed is an improved and less expensive erector-sealer stuffer that requires fewer operators and takes up a smaller footprint in a factory floor plan. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a system for forming a case assembly, the system may comprise: (a) an assembly frame; (b) one or more knock-down flat dispensers mechanically coupled to at least one portion of an outer surface of the assembly frame; (c) one or more conveyors wherein one conveyor may be configured to receive a first knock-down flat from the knock-down flat dispenser and at least one alternative conveyor may be configured to receive a second knock-down flat from an alternative knockdown flat dispenser; (d) an opening and folding assembly configured about a first conveyor to open the first knock-down flat thereby turning the first knock-down flat into a first box and fold the panels of the first box, the opening and folding assembly may comprise: (i) a first knock-down flat opening apparatus that may be configured to mechanically couple to the first knock-down flat and may raise the first knock-down flat into an open position such that the first knock-down flat becomes a first box; (ii) at least one minor panel folding apparatus that may be configured to press against a minor panel of the first box; and (iii) at least one minor and major panel folding apparatus that may be configured to press against at least one minor panel of the first box and one or more major panels of the first box; (e) a compression assembly configured to compress and seal the minor panels and major panels of the first box together, the compression assembly may comprise: (i) a compression drive system that can be configured to mechanically press against the minor panels of the first box; and (ii) a compression pressing plate can be configured to mechanically press against the major panels of the first box; (f) an embedding assembly may be configured to embed the first box with the second box, the embedding assembly may comprise: (i) an embedding apparatus that may be mechanically coupled to the assembly frame; (ii) a second knock-down flat opening apparatus that may be mechanically coupled to the assembly frame; (iii) a top corner guide that may be mechanically coupled to the assembly frame; (iv) a bottom corner guide that may be mechanically coupled to the assembly frame; (v) such that the opening apparatus may be configured to mechanically couple to the second knock-down flat and raise to an open position forming a second box; and (vi) such that the embedding apparatus can be configured to press against the bottom surface of the first box embedding the first box and the second box; (g) such that the first knock-down flat may travel along the respective conveyor configured to stop first, at the opening and folding assembly, next the compression assembly, and finally the embedding assembly; and (h) such that the second knock-down flat can travel along the respective conveyor to the embedding system wherein the first knock-down flat is embedded into the second knock-down flat whereby forming a case assembly.

In some embodiments, the embedding assembly may comprise a top corner guide that is configured to rotate into the top corner of the first knock-down flat. In some embodiments, the embedding assembly further may comprise a bottom corner guide whereby the bottom corner guide is configured to rotate into the bottom corner of the first knock-down flat.

In some embodiments, the opening and folding assembly may comprise a glue applicator configured to spray a glue substance onto an outer surface of the minor panels of the first box. In some embodiments, the one or more conveyors may comprise a friction drive conveyor system having multiple strands of round belts and stoppers positioned between the belts.

In some embodiments, the system may further comprise one or more stops mechanically coupled to the one or more conveyors. The one or more stops may comprise a stop plate configured to stop the movement of a knock-down flat when activated. In some embodiments, the assembly may comprise a discharge belt mechanically coupled to a conveyor, extending outward from the assembly frame. In some embodiments, the assembly further comprises of an overhead compression roller mechanically coupled to the assembly frame extending from the start of the open and fold assembly until the end of the compression system.

In some embodiments, the system further may comprise a control module communicatively coupled to the one or more conveyors, the one or more knock-down flat dispensers, the open and folding assembly, the compression assembly, and the embedding assembly, and the discharge belt. In some embodiments, the system for forming a case assembly may be configured to form case assemblies of various dimensions and sizes.

In some embodiments, the system may further comprise a hold down retainer that may be mechanically coupled to the compression drive system such that the hold down retainer may extend away from the compression drive system along the center line of the alterative conveyor towards the embedding assembly. In some embodiments, the hold down retainer may comprise a first end and a second end.

In some embodiments the first end of the hold down retainer may be mechanically coupled to the compression drive system and vertically offset along the center line of the alternative conveyor. In some embodiments, the second end of the hold down retainer may be disposed on the top surface of the alternative conveyor such that the second KDF carried by the alternative conveyor may pass under the hold down retainer that may allow the hold down retainer to apply a frictional force onto the second KDF to stabilize and/or mitigate misalignment of the second KDF.

Moreover, another aspect of the present disclosure pertains to an assembly for compressing the panels of a box that may comprise: (a) a compression drive system, the compression drive system may comprise: (i) a motor; (ii) a drive crank that may be mechanically coupled to the motor; (iii) a home proximity switch that may be communicatively coupled to the motor; (iv) a crank arm that may be operably coupled to the drive crank; (v) one or more compression cylinders that may be operably coupled to the crank arm; and (vi) one or more pressure pads that may be operably coupled around the end of a corresponding compression cylinder; (b) a back plate apparatus, the back plate apparatus may comprise: (i) a motor; (ii) a back plate operably coupled to the motor; and (iii) such that the back plate may be configured to extend outward by the motor when activated; (c) such that the compression drive system can be configured to press against at least one minor flap of a box; and (d) such that the compression pressing plate of the compression plate system can be configured to simultaneously press against at least one major flap of a box.

In some embodiments, the compression drive system may be mechanically coupled to an assembly frame of an outer assembly such that the compression drive system is configured to extend over a conveyor of the second knock-down flat allowing a knock-down flat resting on the conveyor to travel underneath the compression drive system.

In some embodiments, the one or more air compressors of the compression and/or the one or more compression plates of the compression drive system can be configured to be compressible to at least an inch. In some embodiments, the compression drive system can further comprise a magnet operably coupled to the drive crank thereby ensuring the crank arm stays at its rest position.

In some embodiments, the compression drive system may further comprise connecting plate operably coupled to the crank arm thereby allowing the crank arm to extend towards the knock-down flat. In some embodiments, the home proximity switch may be communicatively coupled with the crank arm thereby allowing the proximity switch to control the cycle, movement, or both of the crank arm.

Additionally, another aspect of the present disclosure pertains to a method for forming a case assembly, the method may comprise: (a) driving the first knock-down flat to the opening and folding assembly; (b) opening, via the opening and folding assembly, the first knock-down flat, forming a fist box; (c) folding, via the opening and folding assembly, the panels of the first box; (d) gluing, via the opening and folding assembly, the minor panels of the first box; (e) driving the first box to the compression assembly; (f) compressing, via the compression assembly, the major panels and minor panels of the first box forming a seal; (g) driving the first box to the embedding assembly; (h) driving the second box to the embedding assembly; and (i) embedding, via the embedding assembly, the first box and the second box together forming a case assembly.

In some embodiments, the method may further comprise the step of dispensing, from a knock-down flat dispenser, a first knock-down flat onto a first conveyor. In some embodiments, the method may further comprise the step of dispensing, from a knock-down flat dispenser, a second knock-down flat onto a second conveyor.

In some embodiments, the method may be reversed such that the second box can be embedded into the first box forming a completed assembly.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1A:
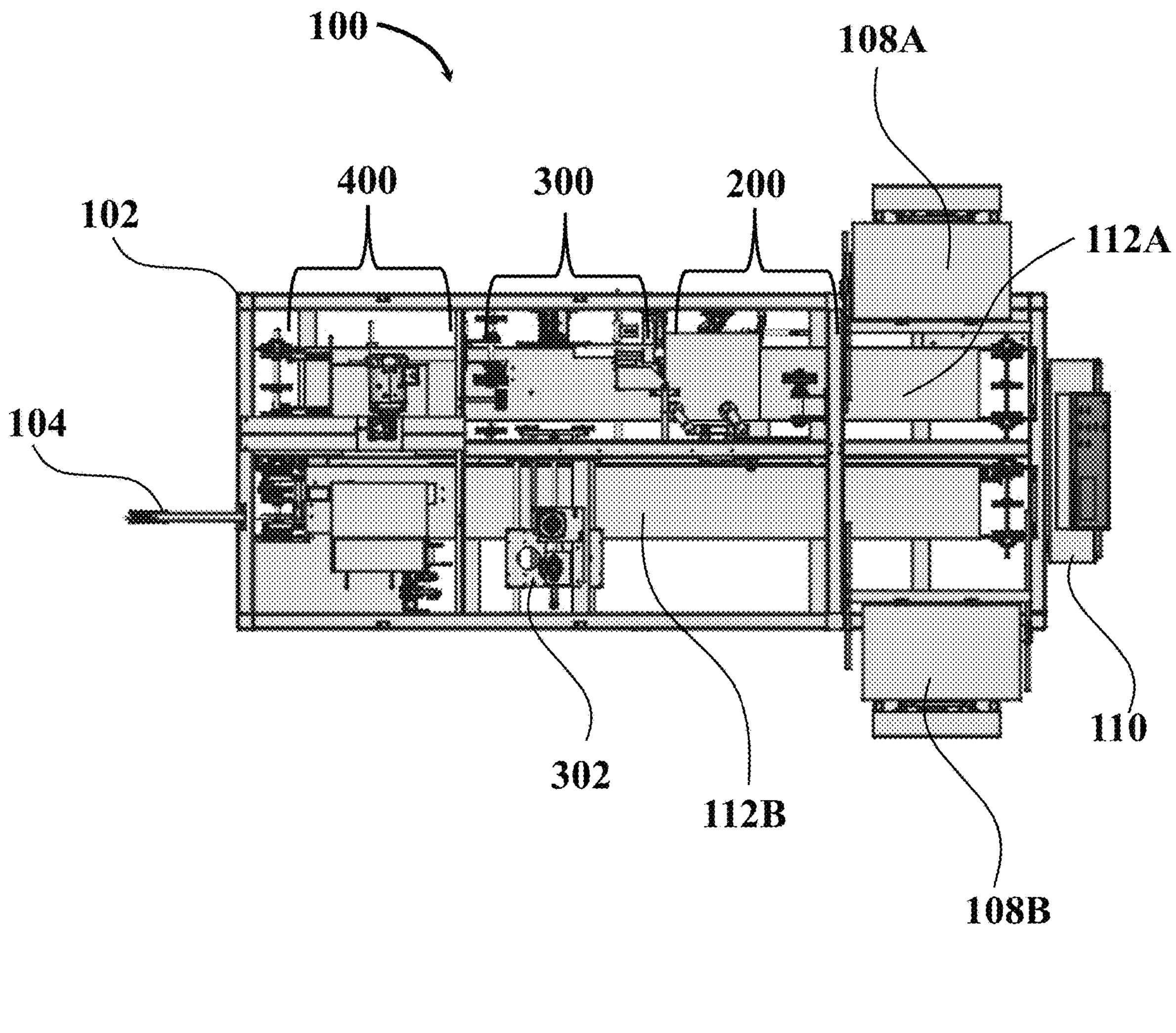
FIG. 1A is a graphical illustration depicting a top-down view of a case assembly system to create a case assembly for the packing of products, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention.

As such, elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification, described herein, are for illustration and should not be construed as limiting. For example, any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Therefore, a reference to first and/or second elements does not mean that only two elements may be employed there or that the first element must precede the second element in some manner. Also, unless stated otherwise a set of elements may comprise one or more elements.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Referring in general to the following description and accompanying drawings, various embodiments of the present disclosure are illustrated to show its structure and method of operation. Common elements of the illustrated embodiments may be designated with similar reference numerals.

Accordingly, the relevant descriptions of such features apply equally to the features and related components among all the drawings. For example, any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

Definitions

As used in this specification and the appended claims, the singular forms "a," "an," and "the" include plural referents unless the content clearly dictates otherwise. As used in this specification and the appended claims, the term "of" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

As used herein, the terms "about," "approximately," or "roughly" refer to being within an acceptable error range (i.e., tolerance) for the particular value as determined by one of ordinary skill in the art, which will depend in part on how the value is measured or determined (e.g., the limitations of a measurement system) (e.g., the degree of precision required for a particular purpose, such as packaging and/or delivery of at least one prosthesis and/or prosthetic implant into a surgical pocket). As used herein, "about," "approximately," or "roughly" refer to within ±25% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about." It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Case Assembly System

The present disclosure pertains to an optimum, low-cost system for folding, sealing, and embedding a first knock-down flat (hereinafter "KDF") into a second KDF to form a case assembly, also known as half-slotted containers (hereinafter "HSCs"), with strengthened vertical walls. Alternatively, the second KDF can be embedded into the first KDF. The KDF is a flat, folded configuration of a corrugated box. In its collapsed state, the KDF consists of a single sheet of pre-scored and pre-folded material. The KDF has at least one minor panel as well as one major panel. The minor panels and major panels are operably coupled to the same end of the KDF. Furthermore, the KDF includes four sides.

In the flat, folded configuration the major and minor panels and sides of the KDF lay flat against each other. When the KDF is opened via any opening apparatus, system, and/or assembly described herein, the KDF forms a three-dimensional box structure. At this stage, the KDF is defined as a box.

The box having a first end and a second end and an inner cavity extending between the first and second end. Additionally, the box has at least one minor panel and at least one major panel. The minor panels and major panels being operably coupled to the same end of the box. The first KDF is directly related to a first box. The second KDF is directly related to a second box. The present disclosure pertains to a case assembly system that can embed a first box into a second box and/or a second box into a first box forming a case assembly.

In some embodiments, the case assembly system comprises an assembly frame. The case assembly system includes one or more knock-down flat dispensers. The one or more knock-down flat dispensers are mechanically coupled to at least one portion of an outer surface of the assembly frame. Moreover, in some embodiments, the system includes one or more conveyors wherein one conveyor are configured to receive a first knock-down flat from the knock-down flat dispenser and at least one alternative conveyor may be configured to receive a second knock-down flat from an alternative knock-down flat dispenser.

The case assembly further comprises an opening and folding assembly. The opening and folding assembly is configured to open the first knock-down flat such that the first knock-down flat transitions to a first box. The opening and folding assembly being further configured to fold the one or more major and/or minor panels of the first box.

The opening and folding assembly comprises a first KDF opening apparatus. The first KDF opening apparatus configured to operably couple to the first knock-down flat such that the opening apparatus can raise the first knock-down flat into an open position. In this open position, the first KDF becomes the first box.

Additionally, the opening and folding assembly comprises a minor panel folding apparatus. The minor panel folding apparatus configured to mechanically couple to at least one minor panel of the first box such that the minor panel of the first box can be folded inwards. Moreover, the opening and folding assembly further comprises a minor and major panel folding apparatus. The minor and major panel folding apparatus is configured to fold at least one minor panel of the first box. Additionally, the one or more minor and major panel folding apparatus can be configured to fold the major panels of the first box inwards to a degree of about 45 degrees. The minor and major panel folding apparatus can fold a minor panel of the first box.

Moreover, in some embodiments, the case assembly system further comprises a compression assembly. The compression assembly is configured to compress and seal the minor panels and major panels of the first box against each other. In some embodiments, the compression assembly comprises a compression drive system. The compression drive system can operably couple to the minor panels of the first box such that the compression drive system presses and compresses the minor panels of the first box against the major panels of the first box.

Additionally, the compression assembly includes a back plate apparatus. The back plate apparatus may be operably coupled with the major panels of the first box such that the back plate apparatus presses and compresses the major panels of the first box against the minor panels of the first box.

Furthermore, the case assembly system includes an embedding assembly. The embedding assembly is configured to embed the first box into the second box. Alternatively, in some embodiments, the embedding assembly can be configured to encase the first box around the second box such that the second box is embedded into the first box.

In some embodiments, the embedding assembly further comprises a second KDF opening apparatus such that the second KDF opening apparatus can operably couple to the second knock-down flat. The second KDF opening apparatus lifts the second KDF into an open position such that the second KDF transitions to a second box.

Additionally, the embedding assembly further comprises an embedding apparatus. The embedding apparatus can apply a directional force onto the first box such that the embedding apparatus can translate the first box in a direction towards the second box. In this manner, the embedding apparatus can embed the first box into the second box. Alternatively, in some embodiments, the embedding apparatus may embed the second box into the first box.

Moreover, in some embodiments, the embedding assembly includes one or more top corner guides. The one or more top corner guides can assist in guiding the first box into the second box during the embedding process. The ends of the one or more top corner guides can rotate into the top corner of the second box such that they can expand and/or stretch the second box and guide the first box into the second box. Alternatively, in some embodiments, the top corner guides may be oriented such that the top corner guides can assist in encasing the first box around the second box such that the second box is embedded into the first box.

Additionally, the embedding assembly includes one or more bottom corner guides. The one or more bottom corner guides perform substantively the same function as the one or more top corner guides for the bottom corners of the second box. In some alternative embodiments, the bottom corner guides may be oriented such that the bottom corner guides can assist in encasing the first box around the second box such that the second box is embedded into the first box.

Furthermore, the embedding assembly comprises a second KDF opening apparatus. The second KDF opening apparatus mechanically coupling to the second knock-down flat and raising the second to an open position. Furthermore, in some embodiments, the embedding apparatus can be configured to press against the bottom surface of the first knock-down flat until the first knock-down flat is embedded into the second knock-down flat.

Furthermore, in some embodiments, the case assembly is configured such that the first knock-down flat and/or first box may travel along the respective conveyor configured to stop first at the opening and folding assembly, next the compression assembly, and finally the embedding assembly. In some embodiments, the case assembly system can be configured such that the second knock-down flat and/or second box can travel along the respective conveyor to the embedding system wherein the first knock-down flat is embedded into the second knock-down flat forming a case assembly.

Figure 1B:
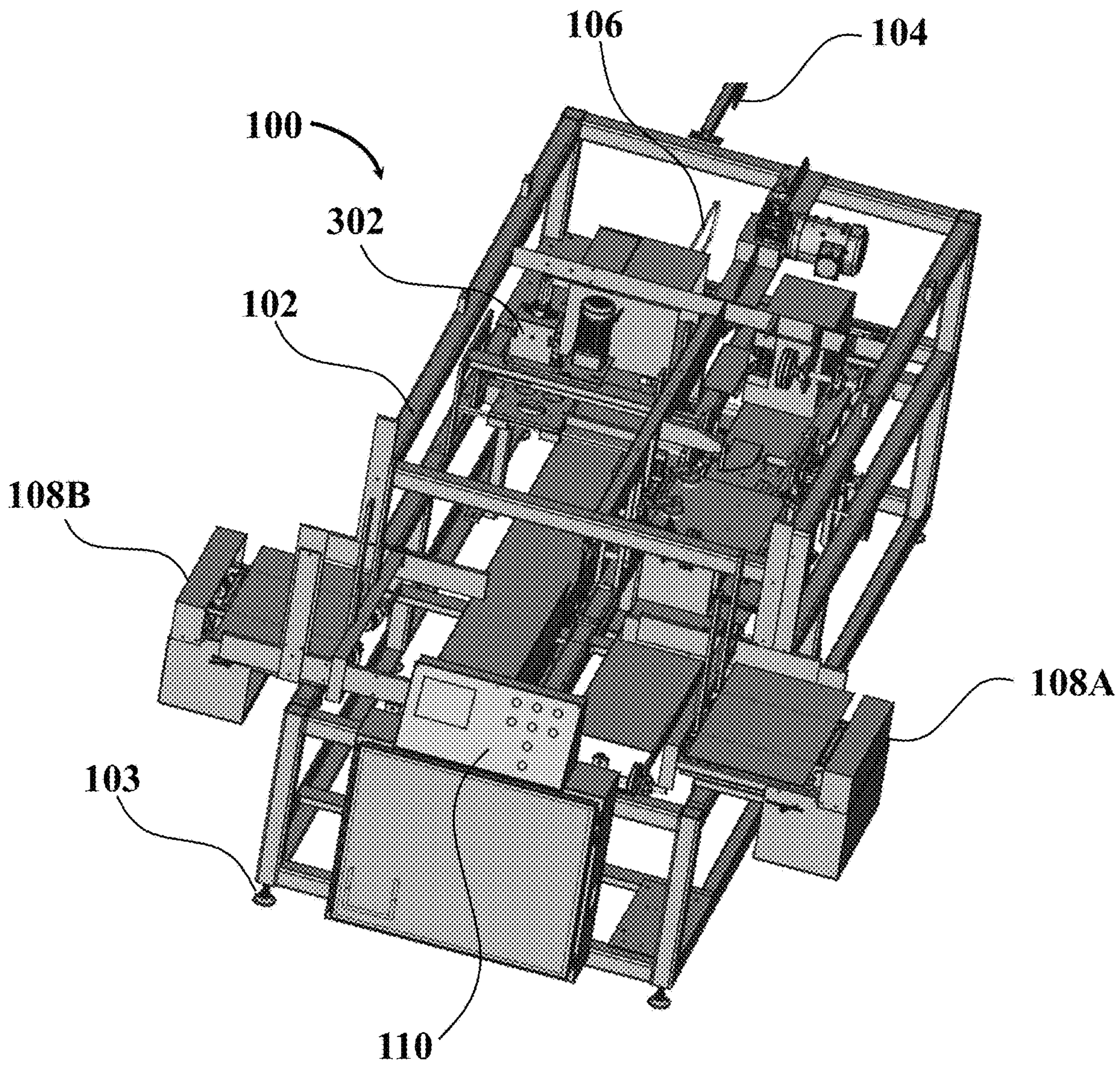
FIG. 1B is a graphical illustration depicting a first elevated isometric illustration of a case assembly system to create a case assembly for the packing of products, according to an embodiment of the present disclosure.
Figure 1C:
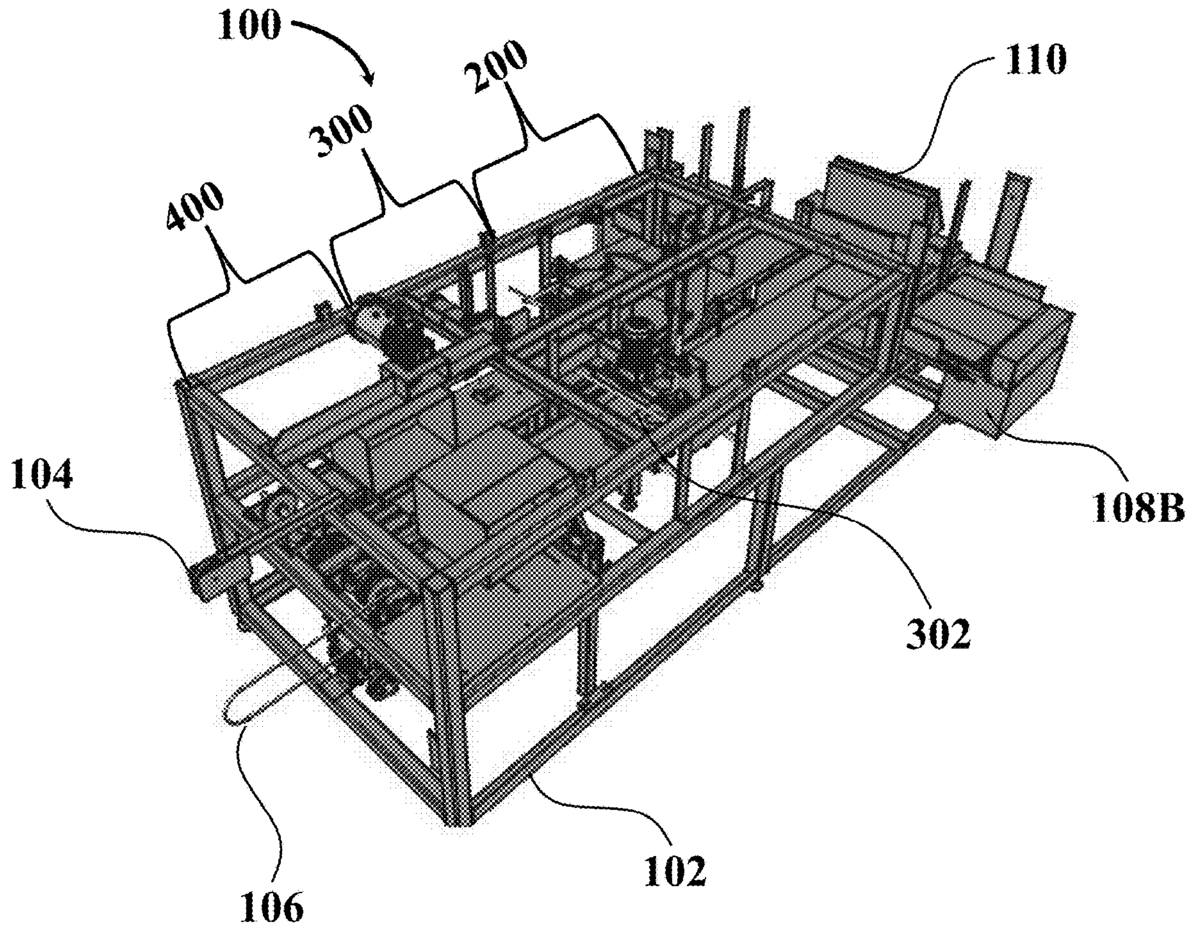
FIG. 1C is a graphical illustration depicting a second elevated isometric illustration of a case assembly system to create a case assembly for the packing of products, according to an embodiment of the present disclosure.
Figure 2:
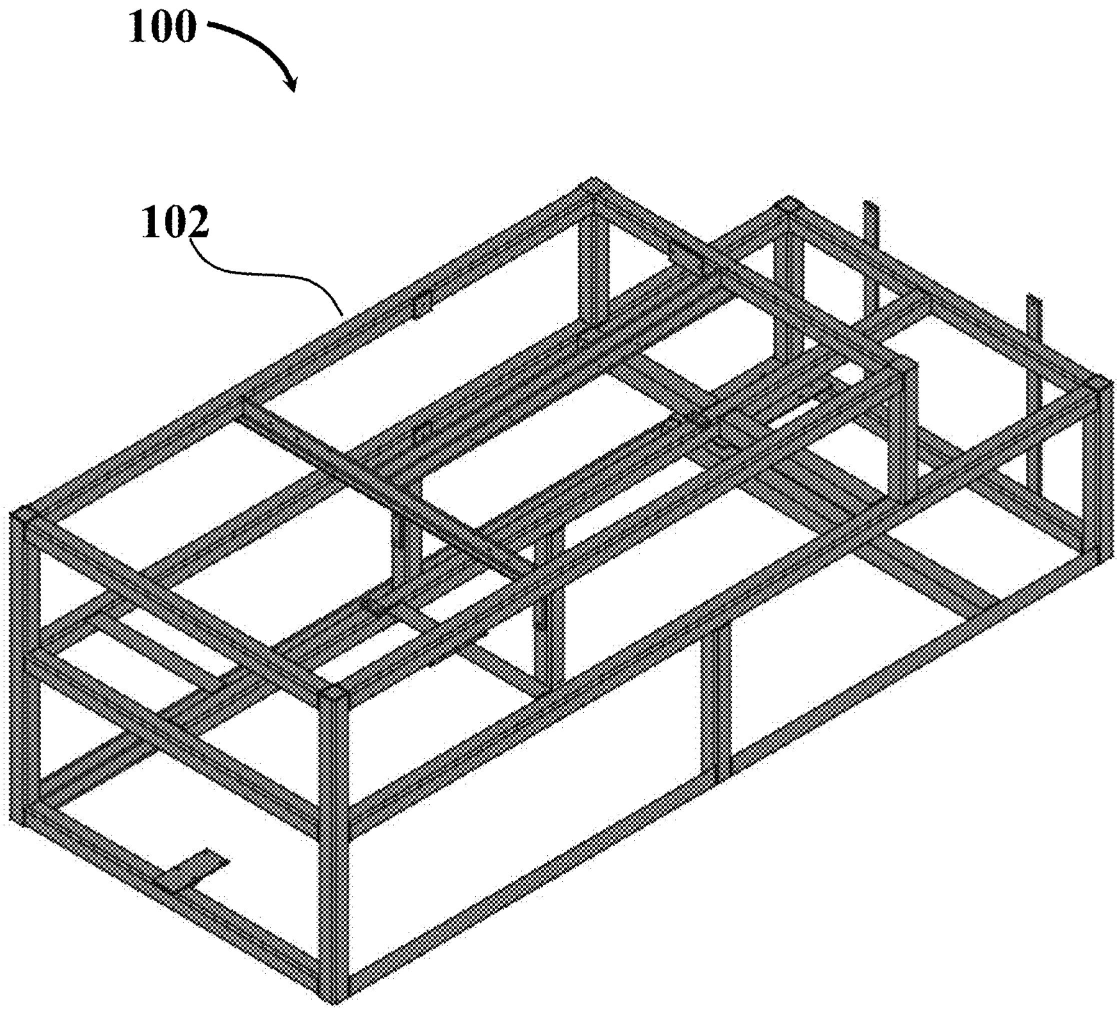
FIG. 2 is a graphical illustration depicting an isometric view of a frame of a case assembly system to create a case assembly for the packing of products, according to an embodiment of the present disclosure.

As such, FIGS. 1A-1C depict perspective views of case assembly system 100, according to an embodiment of the present disclosure. In some embodiments, as shown in FIG. 2 in conjunction with FIGS. 1A-1C, case assembly system 100 includes an assembly frame 102. Assembly frame 102 being a rigid, modular structure to support the mechanical and electrical assemblies and systems of case assembly system 100. Moreover, assembly frame 102 can further comprise a series of receiving slots and/or adjustable rails to allow for adjustment and/or modification of case assembly system 100.

In some embodiments, assembly frame 102 can be designed in such a manner as to minimize vibration during assembly process to reduce misalignment of the KDFs and/or boxes during the assembly process. As shown in FIGS. 1A-1C, assembly frame 102 is elevated from the ground by a series of supports 103 to reduce movement and vibrations during operation of case assembly system 100.

In some embodiments, assembly frame 102 may be constructed of durable materials selected from a group consisting of steel, aluminum, metal alloys, wood, plastic, carbon composites, and a combination thereof. For ease of reference, the exemplary embodiment disclosed herein refers to steel although this is a nonlimiting reference, but this description should not be interpreted as exclusionary of other types of durable materials.

Figure 3:
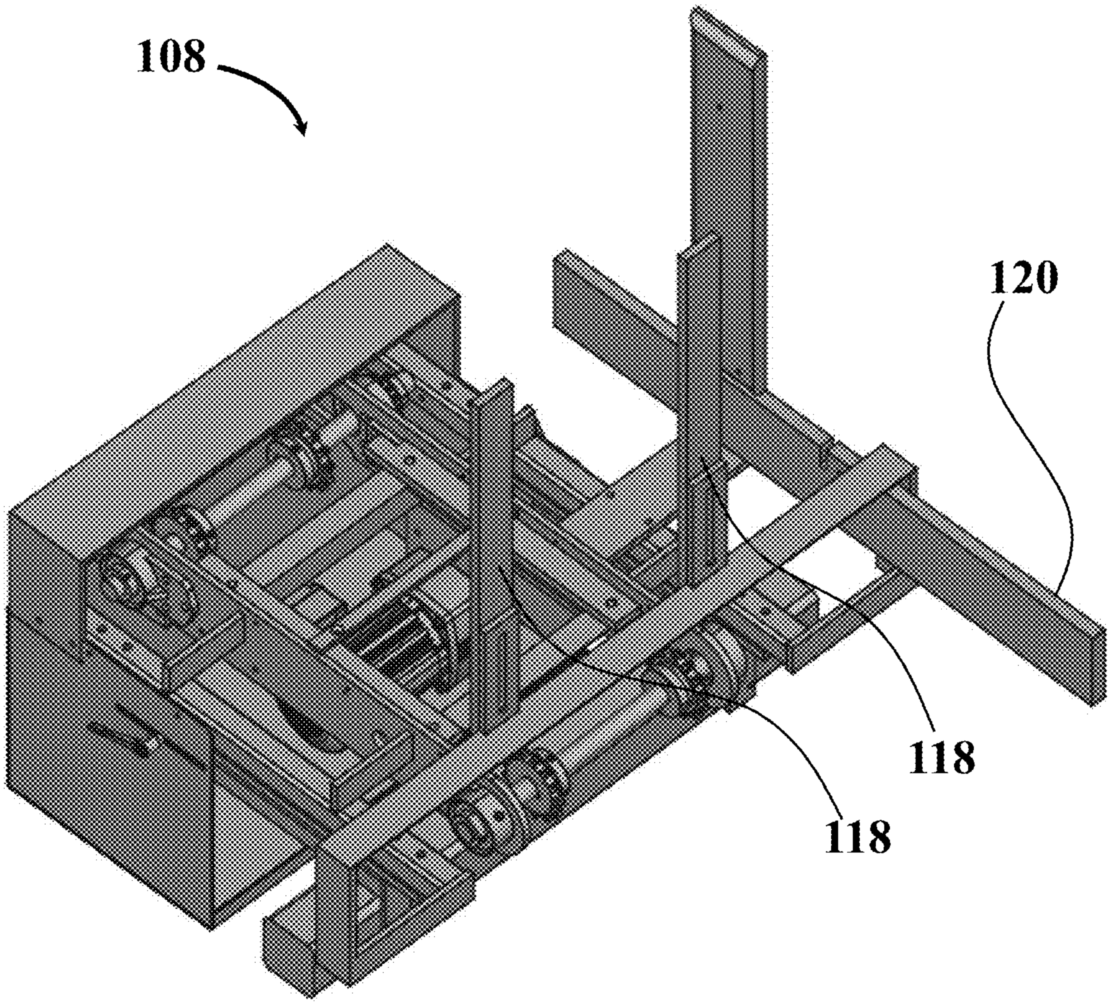
FIG. 3 is a graphical illustration depicting an isometric view of a knock-down-flat dispenser, according to an embodiment of the present disclosure.

As best shown in FIGS. 1A-1B, in conjunction with FIG. 3, case assembly system 100 includes KDF dispensers 108A and 108B. As depicted, KDF dispensers 108A and 108B are mechanically coupled to assembly frame 102 such that KDF dispenser 108A is positioned on the directly opposite assembly frame 102 from KDF dispenser 108B.

Moreover, KDF dispensers 108A and 108B are configured to dispense the KDFs onto conveyors 112A and 112B, respectively. In some embodiments, KDF dispenser 108A and 108B can be configured such that each dispenser will dispense a KDF onto their respective conveyors 112A and 112B at the same rate and time.

Furthermore, in some embodiments, KDF dispensers 108A and 108B comprise a plurality of box holder supports 118. The plurality of box holder supports 118 are configured to support a plurality of KDFs such that the bottom KDF of the plurality of KDFs is dispensed from KDF dispensers 108A and 108B onto conveyors 112A and 112B, respectively. In some embodiments, KDF dispenser 108A can dispense the first KDF onto conveyor 112A and KDF dispenser 108B can dispense the second KDF onto conveyor 112B. Moreover, KDF dispensers 108A and 108B may operate independently of each other such that one KDF dispenser may dispense a KDF onto their respective conveyor at a different time and/or rate than the other KDF dispenser depending on the need.

As shown in FIG. 3, the KDF dispensers 108A and 108B include a guide beam 120. Guide beam 120 can guide the bottom KDF from KDF dispensers 108A and 108B. In some embodiments, guide beam 120 is configured to preserve the original alignment and orientation of the bottom KDF as it transitions from KDF dispensers 108A and 108B onto the conveyors 112A and 112B. In this manner, the KDF does not become askew or misaligned from its original orientation.

Figure 16:
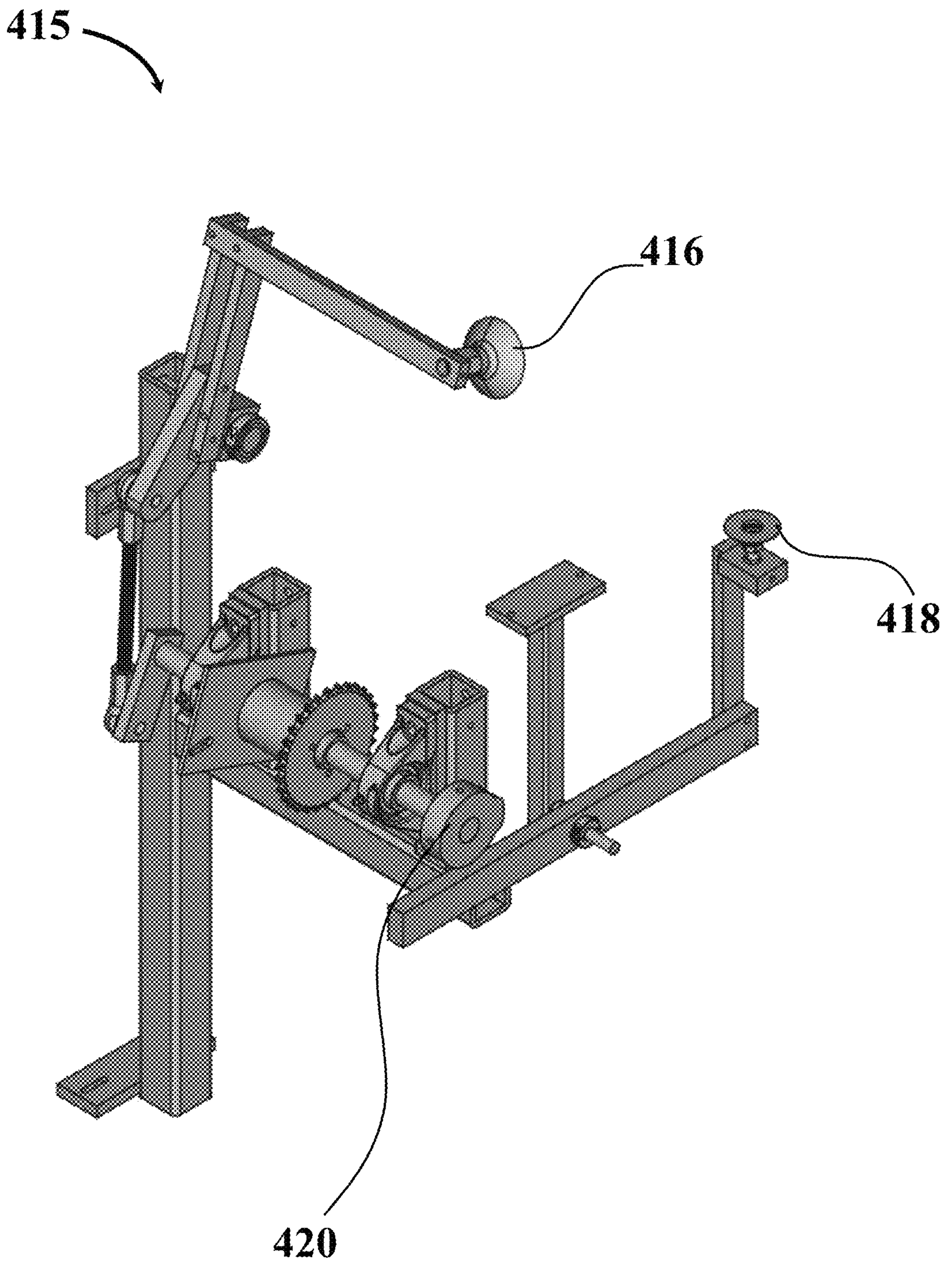
FIG. 16 is a graphical illustration depicting an isometric view of a second knock-down flat opening apparatus, according to an embodiment of the present disclosure.

As shown in FIGS. 1A-1C, in conjunction with FIG. 16, case assembly apparatus 100 includes conveyors 112A and 112B. In some embodiments, conveyors 112A and 112B are operably coupled to assembly frame 102 such that conveyors 112A and 112B extend longitudinally along the midline axis of assembly frame 102. Conveyors 112A and 112B can be configured such that they are parallel to each other and/or are equal length as to one another.

As shown in FIGS. 1A-1C, in conjunction with FIG. 16, a friction drive conveyor system comprises conveyors 112A and 112B. The friction drive conveyor system is configured such that conveyors 112A and 112B operate at the same rate. In some alternative embodiments, the friction drive conveyor system can be configured to allow conveyors 112A and 112B to operate independently and advance at varying and/or different rates as to one another.

Furthermore, in some embodiments, conveyors 112A and 112B of the friction drive conveyor system comprises multiple strands of round belts. The multiple strands of round belts are configured to ensure the KDFs travel along conveyors 112A and 112B. Moreover, the multiple strands of round belts of conveyors 112A and 112B can be configured to rotate about a plurality of conveyor jack shafts 122A and 122B, respectively. Additionally, the friction drive conveyor system further includes a compression roller 130 and a compression weight 132 described further below.

Moreover, the multiple strands of round belts of the friction drive conveyor system assist positioning the first and/or the second KDF and/or box. The design also provides a space between the multiple strands of round belts strands for stops 124A, 124B, 124C, and/or 124D to be mounted. The friction drive conveyor system positions the leading edge of the first or the second KDF and/or box at the stop, regardless of any factory tolerances or off-specification KDFs.

In some embodiments, the plurality of conveyor jack shafts 122A and 122B are configured to rotate in a clockwise manner. In some other embodiments, the plurality of conveyor jack shafts 122A and 122B can rotate in a counterclockwise manner if an error in the process of case assembly system 100 is detected such that conveyors 112A and/or 112B may be reversed to correct the error.

As shown in FIGS. 1A-1C, case assembly system 100 comprises an opening and folding assembly 200. In some embodiments, opening and folding assembly 200 is configured about conveyor 112A such that the first KDF and/or box carried along conveyor 112A first undergoes the process carried out by opening and folding assembly 200.

In some embodiments, case assembly system 100 includes a compression assembly 300. Compression assembly 300 is configured about conveyor 112A and subsequent to opening and folding assembly 200 such that the first KDF and/or first box carried along conveyor 112A will travel through compression assembly 300 after passing through opening and folding assembly 200 and undergo the process carried out by compression assembly 300.

Moreover, case assembly system 100 includes an embedding assembly 400. Embedding assembly 400 is configured about conveyors 112A and 112B and subsequent to opening and folding assembly 200 and compression assembly 300. In some embodiments, embedding assembly 400 can interact with the first box and second box carried along conveyors 112A and 112B, respectively.

Additionally, case assembly system 100 comprises one or more sensors. The one or more sensors disposed throughout each assembly of case assembly system 100. As such, the one or more sensors are configured about conveyors 112A and 112B. The one or more sensors can be communicatively coupled to one another and/or to a control module 110. In this manner, the one or more sensors detect and coordinate the movement of the first and second KDF as each one is carried along their respective conveyors as described above.

Furthermore, in some embodiments, the one or more sensors detect the presence of a KDF and communicate with control module 110 to initiate one of the three assemblies as described above. In some embodiments, upon detecting the presence of a KDF and/or box in a desired location the one or more sensors can initiate one or more stops disposed along conveyors 112A and 112 to prevent movement of the KDF and/or box and allow for one of the three assemblies described above to perform their desired functions. Upon completion of the desired functions, the one or more sensors may coordinate with the one or more stops to retract and allow for the KDF and/or box to be carried further along their respective conveyor.

As shown in FIGS. 1A-1C, in some embodiments, case assembly system 100 includes a discharge belt 106. Discharge belt 106 is operably coupled to assembly frame 102 and/or conveyor 112B such that a completed case assembly may be directed by discharge belt 106 from case assembly system 100 onto an outside conveyor. Discharge belt 106 comprises a track. The track being mechanically coupled along the top surface of conveyor 112B such that the completed case assembly can be carried by the track of discharge belt 106 to an outside track. Moreover, discharge belt 106 can utilize inertia such that discharge belt carries the completed case assembly in a manner so that the completed case assembly sits on the bottom of the case assembly on the outside conveyor.

Additionally, case assembly system 100 comprises a discharge guide 104. Discharge guide 104 being mechanically configured to assembly frame 102. Furthermore, discharge guide 104 extends outward away case assembly system 100 in a position above discharge belt 106. In some embodiments, discharge guide 104 can assist discharge belt 106 in moving a completed case assembly from case assembly system 100 onto an outside track.

As shown in FIGS. 1A-1C, case assembly system 100 further comprises a control module 110. Control module 110 is communicatively coupled to conveyor 112A, conveyor 112B, KDF dispenser 108A, KDF dispenser 108B, opening and folding assembly 200, compression assembly 300, embedding assembly 104, one or more stops, pull-out belt 104, a flip-up stop 424, a discharge stop 430, and/or one or more sensors along with other motors, electrical components, and/or subassemblies of case assembly system 100.

In some embodiments, control module 110 allows for an operator to start and/or stop case assembly system 100 at any time during the process. Control module 110 may allow a user to manually control each step of the process and/or assembly of case assembly system 100. Moreover, control module 110 may communicate and/or direct each component of case assembly system 100 independently from each other component of case assembly system 100.

Additionally, control module 110 can be configured to control each subsystem, assembly, apparatus, and/or conveyor of case assembly system 100 such that each one may function independently of the others depending on the choices selected by the operator. In some embodiments, control module 110 allows an operator to control the overall production speed, speed of an assembly, speed of an apparatus of an assembly, conveyors 112A and 112B, and/or speed of any belt of case assembly system 100 independent of one another. Control module 110 may further allow an operator to stop the production of one assembly system while allowing the remaining assembly systems to continue functioning.

In some other embodiments, control module 110 is controlled by an operator a distance away from case assembly system 100 such as utilizing wireless connection and/or Bluetooth allowing an operator to operate the case assembly system 100 from a location away from case assembly system 100.

Additionally, in some other embodiments, control module 110 incorporates a machine learning algorithm such that the machine learning algorithm may operate case assembly system 100 without requiring a human user to start case assembly system 100. The machine learning algorithm can record and track the type of errors and/or jams that occur and notify a human operator of the error and request assistance. The machine learning algorithm may record the efficiency of case assembly system 100 and each system of case assembly system 100 such that the machine learning algorithm can detect potential failures or inefficient systems of case assembly system 100.

Figure 4A:
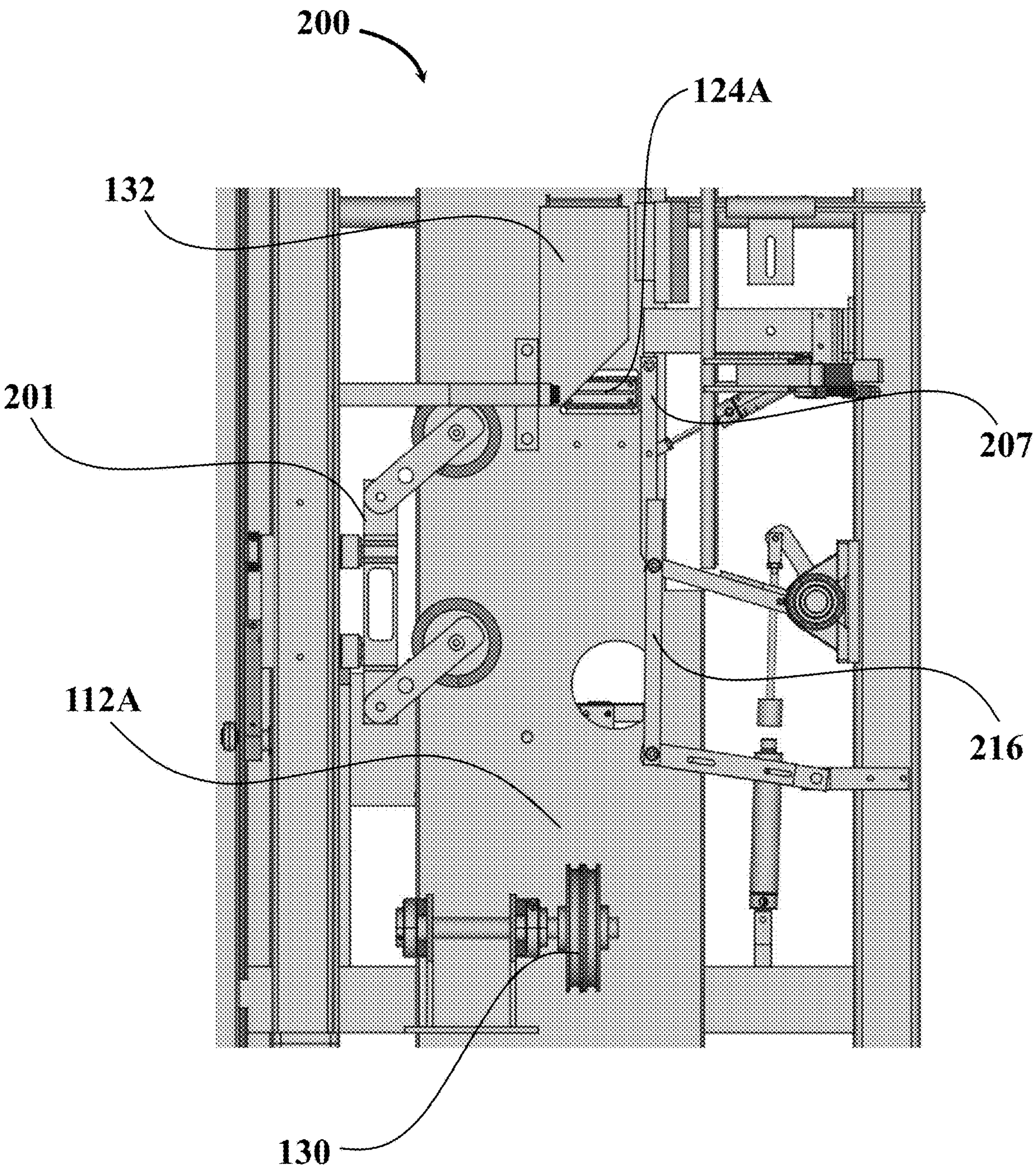
FIG. 4A is a graphical illustration depicting a top-down view of an opener assembly for the first box, according to an embodiment of the present disclosure.
Figure 8:
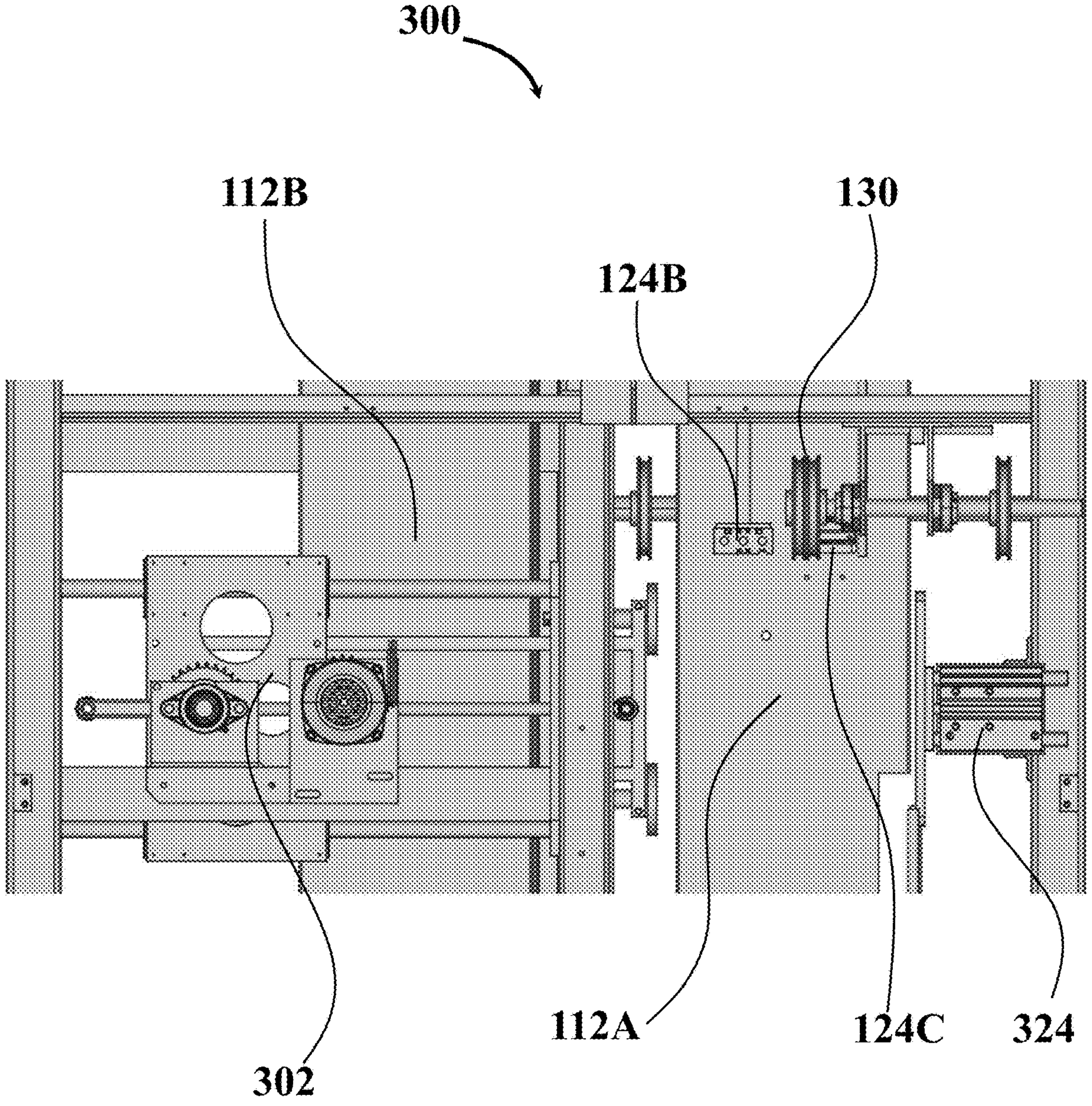
FIG. 8 is a graphical illustration depicting a top-down view of a compression assembly, according to an embodiment of the present disclosure.

In some embodiments, as shown in FIG. 1A, in conjunction with FIG. 4A and FIG. 8, case assembly system 100 comprises a compression roller 130. Compression roller 130 is mechanically coupled to assembly frame 102 such that compression roller 130 is vertically offset and above the center line of conveyor 112A. Compression roller 130 can extend from the start of opening and folding assembly 200 to the end of compression assembly 300.

Moreover, in some embodiments, compression roller 130 comprises multiple strands of round belts in the same manner as described above for conveyors 112A and 112B such that compression roller 130 applies a constant pulling frictional force against a top surface of first box. The round belts of compression roller 130 are configured such that they rotate in a counterclockwise manner, opposite of the rotation of conveyors 112A and/or 112B such that compression roller 130 assists in driving the open first KDF along case assembly system 100.

In some embodiments, compression roller 130 allows for a frictional drive to be placed upon a leading edge of the first box. As such, compression roller 130 directs and guides the leading edge of the first box to abut against one or more stops located at the end of compression assembly 300. In this manner, the leading edge of the first box may always abut against one or more stops regardless of any factory tolerances or incorrect specification of the dimensions of the first KDF. In some embodiments, the leading edge of the first box may abut against stops 124B and 124C. In this manner, stops 124B and 124C are configured so that the angle between a leading minor panel of the first box and a lower major panel of the first box is ninety degrees.

Furthermore, in some embodiments, compression roller 130 includes a compression weight 132. Compression weight 132 is operably coupled to at least one surface of the multiple strands of rounds belts of compression roller 130. Compression weight 132 allows compression roller 130 to apply a greater a frictional force against the first box such that is allows for efficient travel along conveyor 112A. Moreover, in some embodiments, compression weight 132 can be tailored depending on the dimensions and quality of the KDF and/or box utilized such that compression weight 132 may be made lighter with less weight and/or increased in weight depending on the requirement for the specific KDF and/or box.

In some embodiments, in opening and folding assembly 200 and/or compression assembly 300 area, the friction to drive the first box consistently is high. To overcome this high friction, compression roller 130 is included in this area. Compression roller 130 on the top belt maintains a constant friction on the box. The level of friction can be tailored to the specific box characteristics by adjusting compression weight 132 on the belt of compression roller 130. The top belt of compression roller 130 is driven counterclockwise by a reversing jack shaft.

As shown in FIGS. 1A-1C, in conjunction with FIG. 4A and FIG. 8, case assembly system 100 includes one or more stops placed along conveyors 112A and 112B. The one or more stops can be operably coupled to conveyors 112A and 112B such that the one or more stops can extend upward and/or downward in a direction perpendicular to conveyors 112A and/or 112B such that it may temporarily halt and/or prevent a box from travelling further along either conveyors 112A or 112B for a predetermined amount of time.

Figure 17:
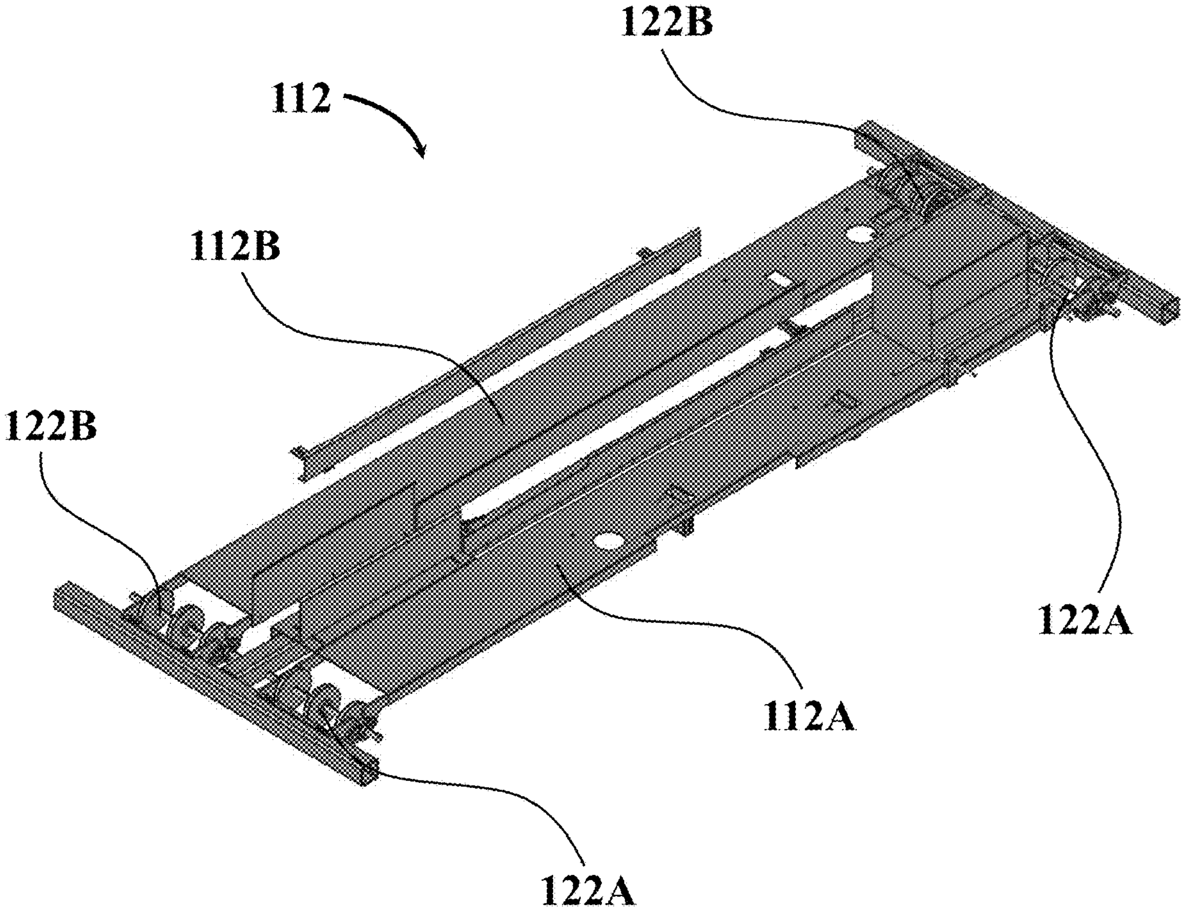
FIG. 17 is a graphical illustration depicting and isometric view of one or more conveyors of a case assembly system to create a case assembly for the packing of products, according to an embodiment of the present disclosure.
Figure 18:
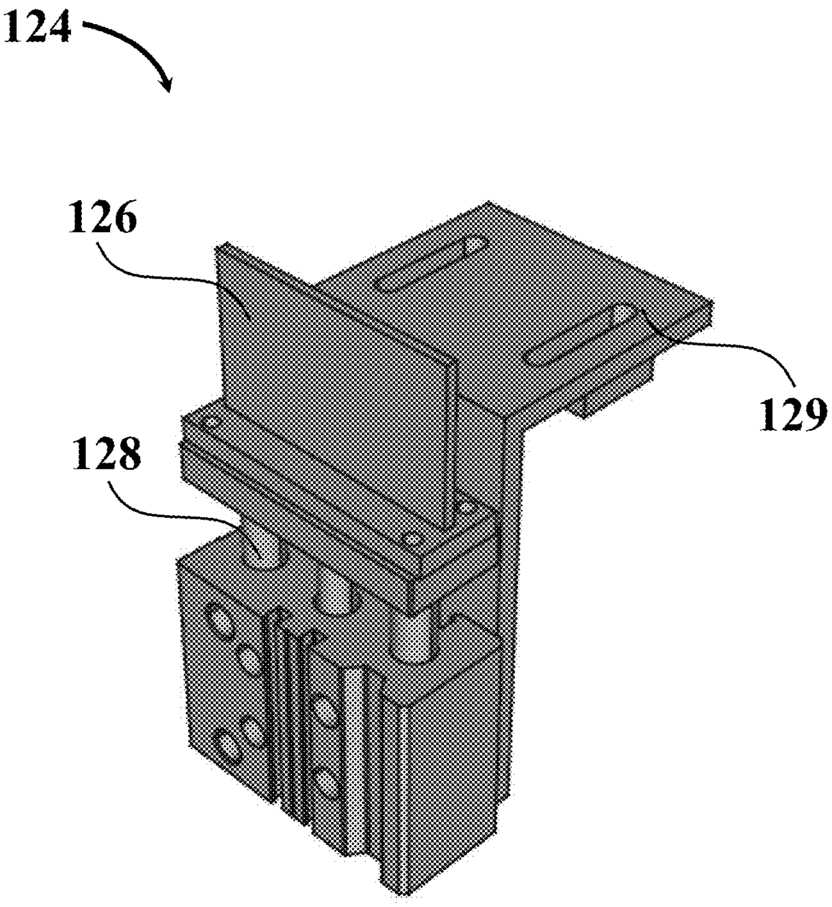
FIG. 18 is a graphical illustration depicting an isometric view of a stop, according to an embodiment of the present disclosure.

As depicted in FIG. 17, the one or more stops include a stop plate 126. Stop plate 126 is configured such that stop plate 126 can be raised by a stop plate lift 128 to a vertical position extending high enough to prevent the movement a KDF and/or box travelling along conveyors 112A and/or 112B for a predetermined set of time. Stop plate lift 128 can raise stop plate 126 utilizing a method selected from a group consisting of hydraulic press, pneumatic actuation, mechanical lever system, electromechanical actuator, and/or spring-loaded mechanism. For ease of reference, the exemplary embodiment disclosed herein refers to the method pneumatic actuation, but this description should not be interpreted as exclusionary of other types of durable materials.

Moreover, in some embodiments, the one or more stops can be mechanically coupled to the underside of conveyor 112A and/or 112B. Additionally, in some embodiments, the one or more stops can be mechanically coupled to a beam of assembly frame 102 by stop connecting plate 129. Stop connecting plate 129 is configured such that one or more stops can be mechanically coupled to assembly frame 102 utilizing various method of connecting consisting of a group of bolts, screws, latches, snaps, and/or a combination thereof. For ease of reference, the exemplary embodiment disclosed used herein refers to bolts, but this description should not be interpreted as exclusionary of other types of durable materials.

Furthermore, in some embodiments, the one or more stops includes stops 124A, 124B, 124C, and 124D. As shown in FIG. 4A, stop 124A is mechanically coupled to conveyor 112A along the end of opening and folding assembly 200. Moreover, as shown in FIG. 8, stop 124B is mechanically coupled to assembly frame 102 such that stop 124B is vertically offset above conveyor 112A near the end of compression assembly 300. Additionally, stop 124C can be mechanically coupled to conveyor 112A near the end of compression assembly 300.

Figure 4B:
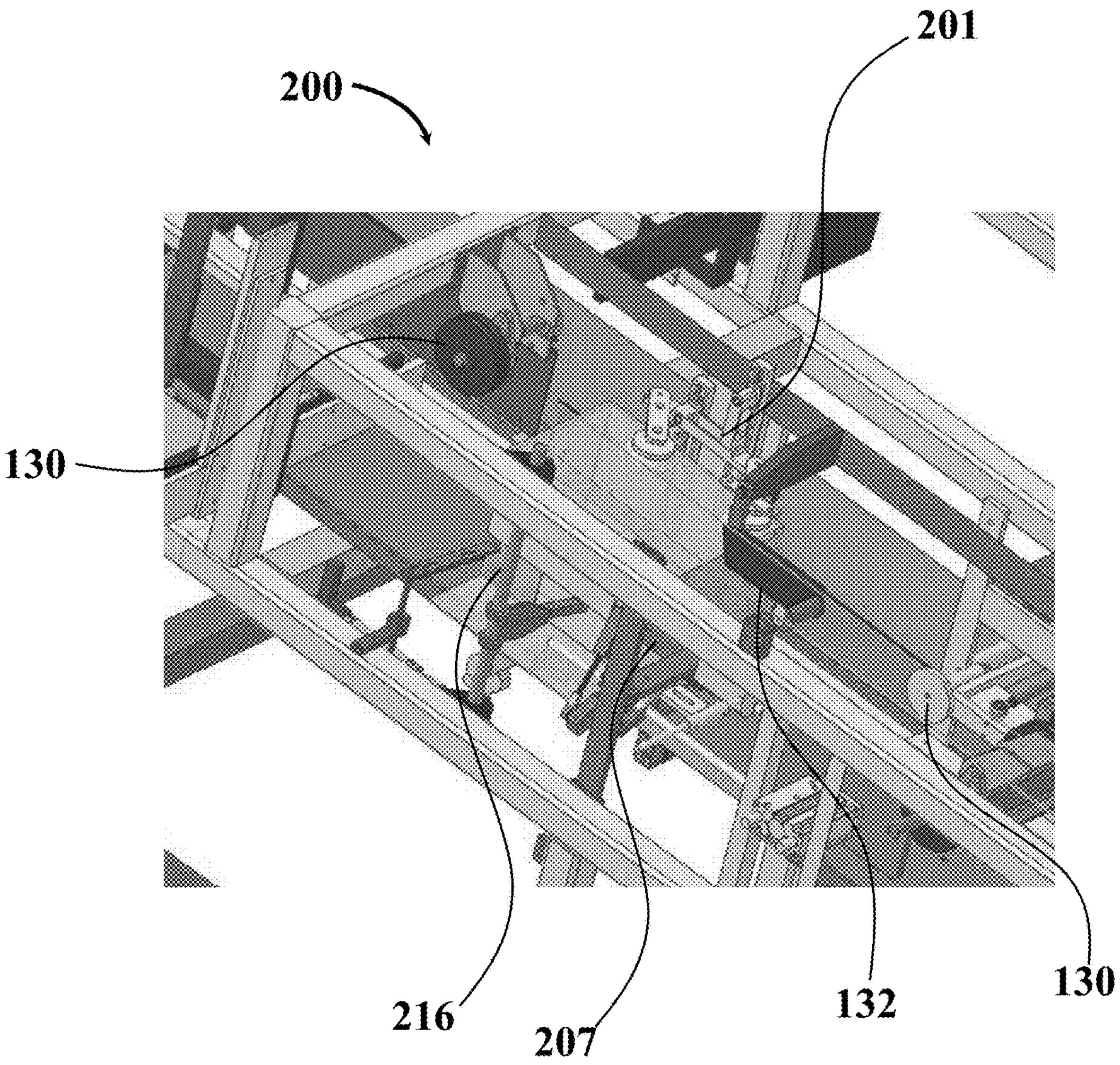
FIG. 4B is a graphical illustration depicting an isometric view of an opener assembly for the first box, according to an embodiment of the present disclosure.

As best depicted in FIGS. 4A-4B, case assembly system 100 comprises opening and folding assembly 200. In some embodiments, opening and folding assembly 200 is configured about conveyor 112A such that the first KDF and/or box must travel through opening and folding assembly 200 while carried by conveyor 112A. In some embodiments, stop 124A is configured such that upon the first KDF reaching opening and folding assembly 200 a sensor of the one or more sensor detects the presence of the first KDF and can electronically communicate with control module 110 and/or stop 124A. In this manner, stop 124A is activated to prevent movement of the first KDF and/or first box until completion of the opening and folding assembly 200 process. Additionally, in some embodiments, upon the retraction of stop 124A, in coordination with the retraction of stops 124B, 124C, and 124D, the sensor of the series of sensors electronically communicate with control module 110 to dispense another KDF from KDF dispensers 108A and 108B.

Moreover, opening and folding assembly 200 includes a first KDF opening apparatus 201. First KDF opening apparatus 201 is mechanically coupled to assembly frame 102 such that first KDF opening apparatus can be positioned between conveyor 112A and 112B. In some embodiments, first KDF opening apparatus 201 can mechanically couple to the first KDF such that KDF opening apparatus 201 raises the first KDF from its flat position into an open position.

As disclosed above, the first KDF in an open position transitions to become the first box. The first box having the major panels and minor panels extend outward away from the center line of assembly frame 102. Additionally, the minor and major panels of the first box extend away from conveyor 112B.

Figure 5:
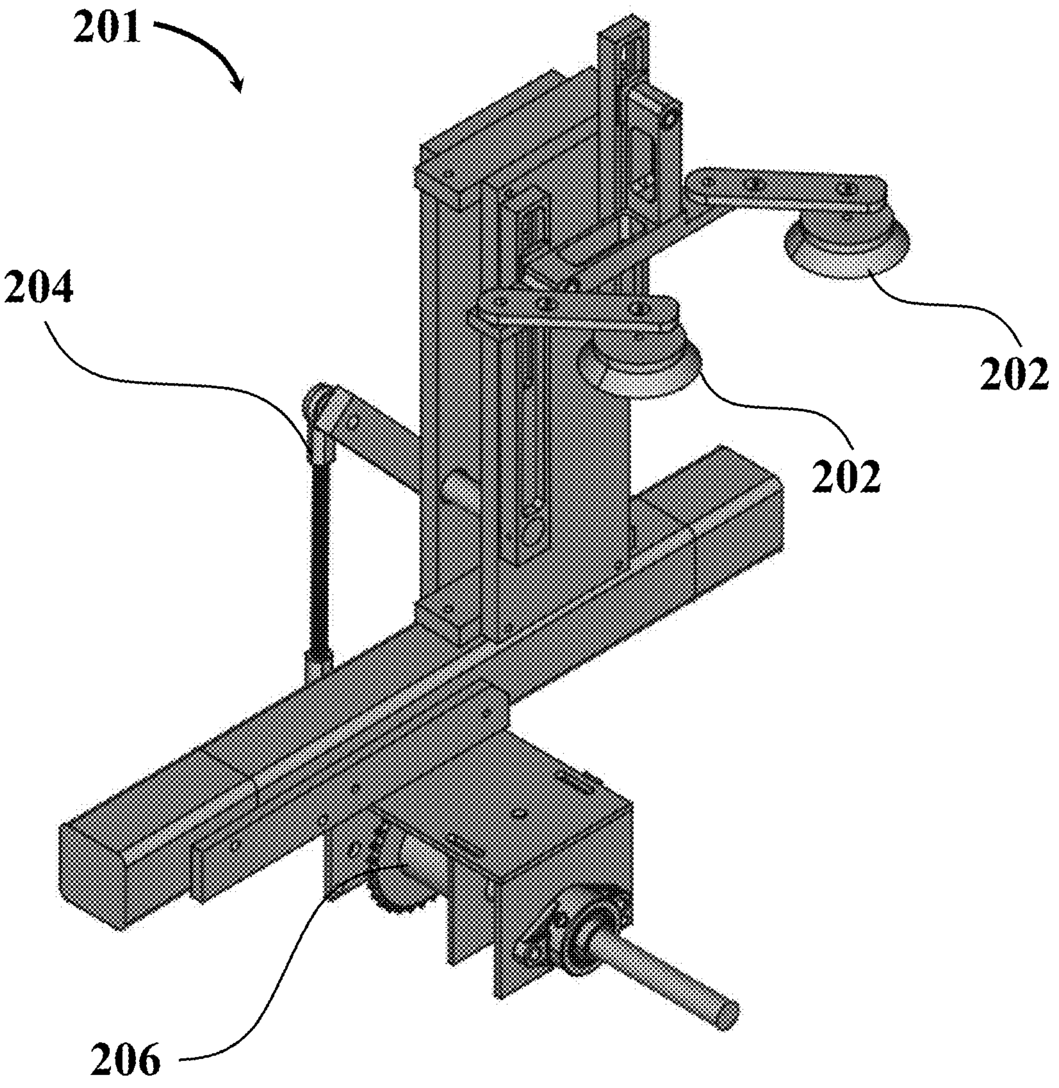
FIG. 5 is a graphical illustration depicting an isometric view of a first knocked-down-flat opening apparatus, according to an embodiment of the present disclosure.

As shown in FIG. 4A in conjunction with FIG. 5, first KDF opening apparatus 201 comprises one or more vacuum cups 202. One or more vacuum cups 202 are configured to travel in a generally offset vertical manner from a rest position such that they contact with at least one surface of the first KDF at a coupling position. Moreover, in some embodiments one or more vacuum cups 202 are mechanically coupled to a threaded rod 204. Threaded rod 204 being operably coupled to a spring-loaded clutch 206. In some alternative embodiments, first KDF opening apparatus 201 may comprise metal clamps, adhesive pads, magnetic holder, air jets, friction rollers, and/or a combination thereof to raise the first KDF into an open position in a similar manner as one or more vacuum cups 202.

In some embodiments, spring-loaded clutch 206 is configured such that the first KDF is raised into an open position to form the first box when a cycle of spring-loaded clutch 206 is complete. The cycle of spring-loaded clutch 206 comprises a 360-degree cycle such that at 0- and/or 360-degrees first KDF opening apparatus 201 is in the rest position such that first KDF opening apparatus may be vertically offset from conveyor 112A. Additionally, at 180 degrees of the cycle of spring-loaded clutch 206 the one or more vacuum cups 202 are in contact with at least one surface of the first KDF forming the coupling position.

Moreover, the cycle of spring-loaded clutch 206 can be configured such that the velocity of first KDF opening apparatus 201 at the 0 degree and 180-degree points of the cycle is zero allowing for the one or more vacuum cups 202 to mechanically couple with at least one surface of the first KDF. In this manner, the cycle of spring-loaded clutch 206 allows for first KDF opening apparatus 201 to travel in a sinusoidal manner such that at the rest and sealing position the velocity of first KDF opening apparatus 201 is zero.

Furthermore, the time of the cycle of spring-loaded clutch 206 may further comprise a range of times of about 0.5 seconds to about 2 seconds, encompassing every value in between. For example, in some embodiments the cycle of spring-loaded clutch 206 may comprise a time of about 1 second. In some alternative embodiments, first KDF opening apparatus 201 may comprise a drive shaft such that the drive shaft may be communicatively coupled to the control module. The drive shaft of the first KDF opening apparatus may be configured to perform a similar function as spring-loaded clutch 206 as described above such that the drive shaft allows for first KDF opening apparatus 201 to move from a rest position to a coupling position.

Figure 6:
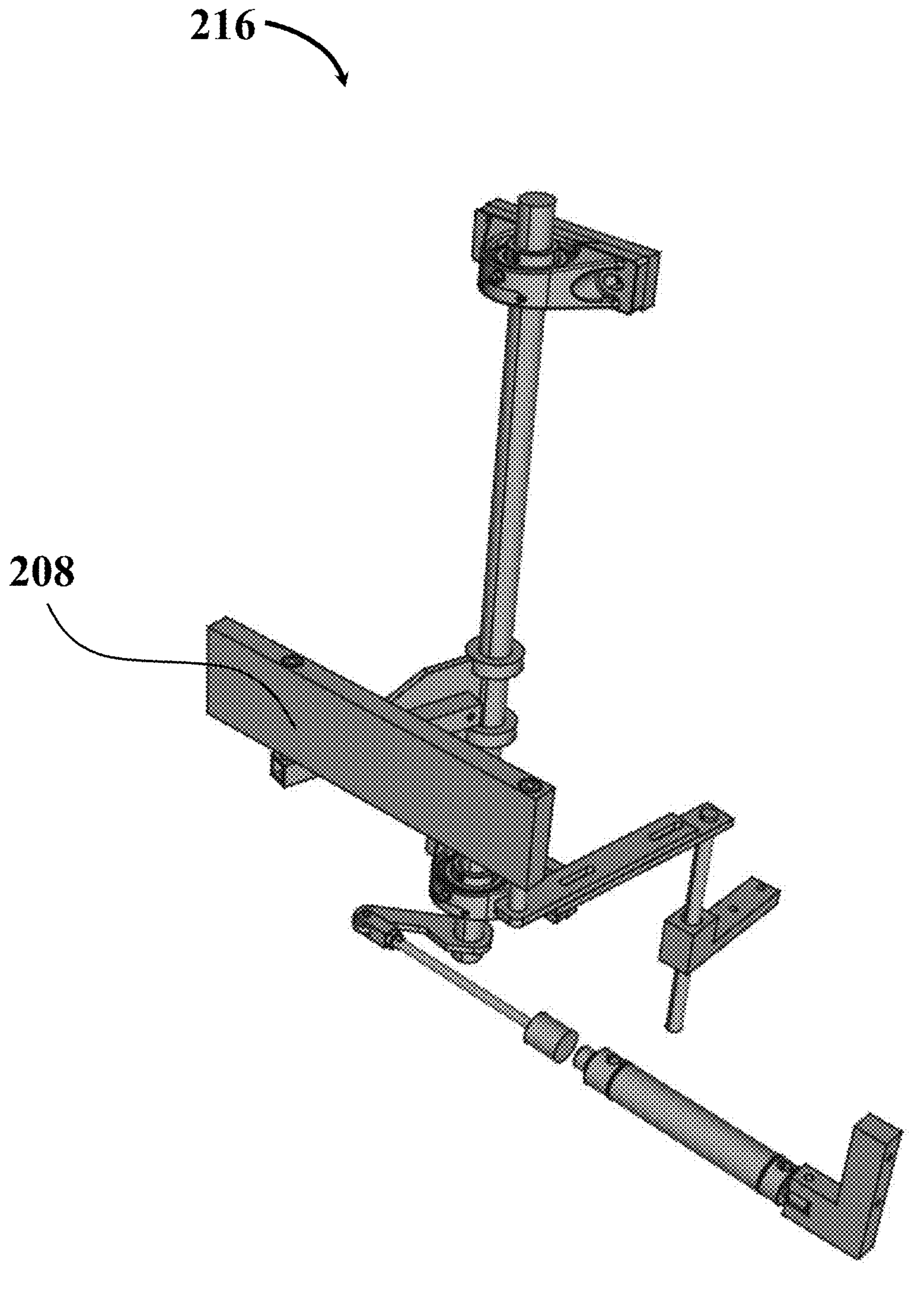
FIG. 6 is a graphical illustration depicting an isometric view of a minor panel folding apparatus

As shown in FIG. 6 in conjunction with FIG. 4A, in some embodiments, opening and folding assembly 200 includes a minor panel folding apparatus 216. Minor panel folding apparatus 216 is mechanically coupled to assembly frame 102 such that the major and minor panels of the first box extend in a direction towards minor panel folding apparatus 216.

Additionally, minor panel folding apparatus 216 comprises a minor panel folder 208. Minor panel folder 208 can extend in a direction towards the center line of assembly frame 102 such that minor panel folder 208 can fold a first minor panel of the first box inward towards a center line of the first box.

Figure 7A:
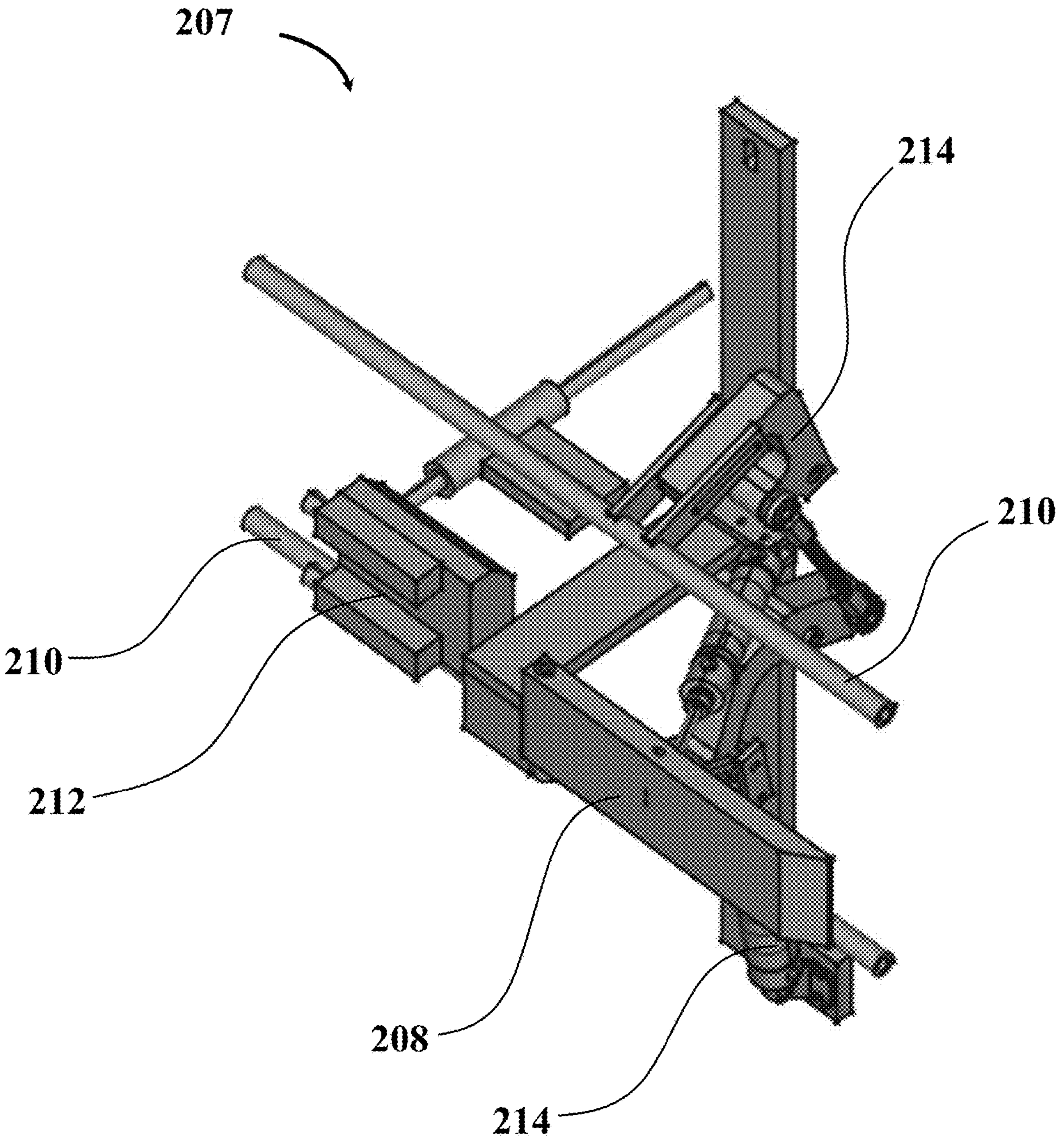
FIG. 7A is a graphical illustration depicting an isometric view of a minor and major panel folding apparatus, according to an embodiment of the present disclosure.
Figure 7B:
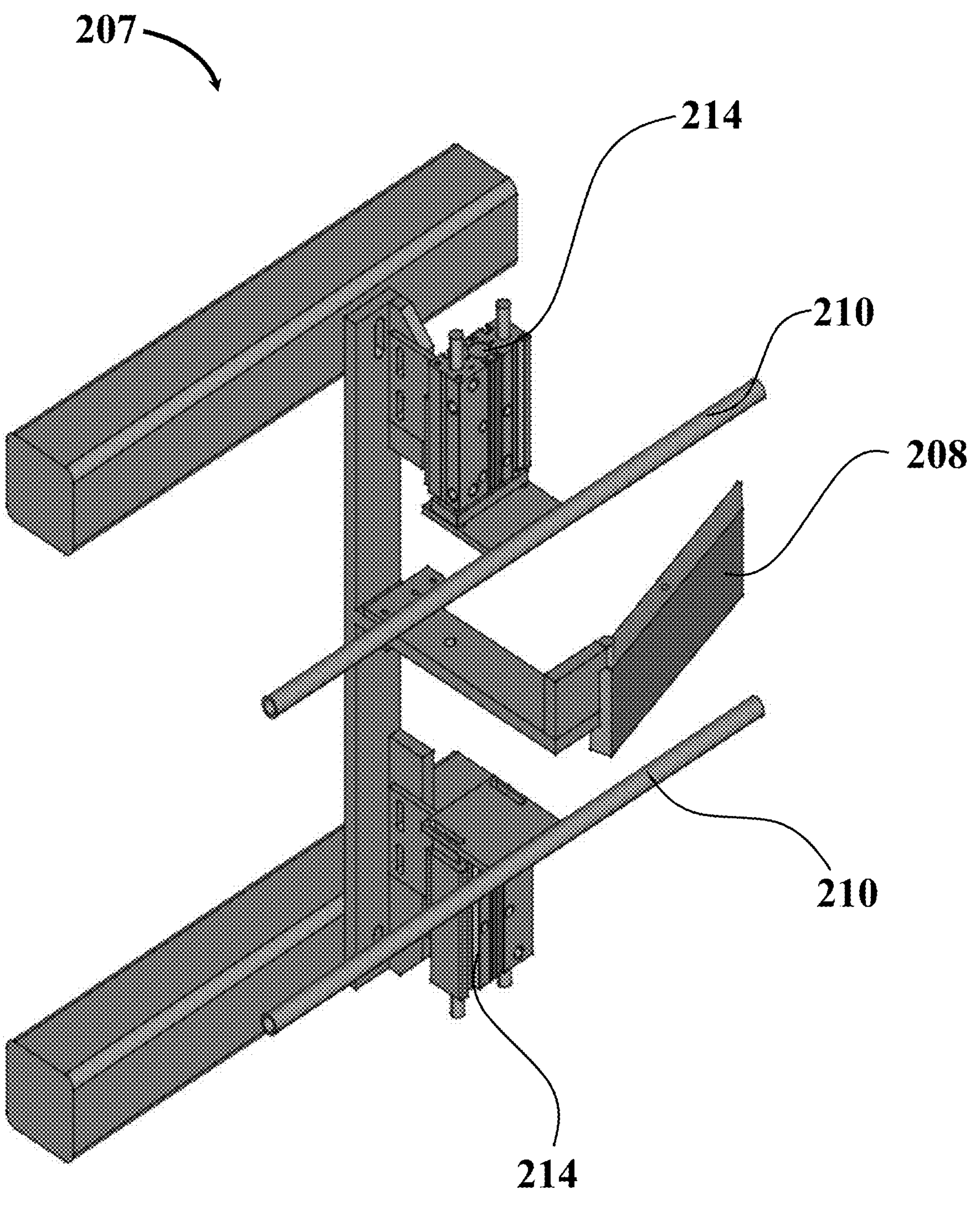
FIG. 7B is a graphical illustration depicting an isometric view of an alternative minor and major panel folding apparatus, according to an embodiment of the present disclosure.

As shown FIGS. 7A-7B, in conjunction with FIG. 4A, opening and folding assembly 200 includes a minor and major panel folding apparatus 207. Minor and major panel folding apparatus is mechanically coupled to assembly frame 102. Additionally, minor and major panel folding apparatus is positioned along assembly frame 102 in a manner similar to minor panel folding apparatus 207 as described above.

Furthermore, in some embodiments, the minor and major panel folding apparatus 207 is subsequent to minor panel folding apparatus 216. In this manner, the first box may interact with minor panel folding apparatus 216 before interacting with minor and major panel folding apparatus 207.

As depicted in FIGS. 7A-7B, in some embodiments, minor and major panel folding apparatus 207 comprises a minor panel folder 208 such that the minor panel folder 208 of minor and major panel folding apparatus 207 operates in a similar manner as the minor panel folder 208 of minor panel folding apparatus 216. In this manner, minor panel folder 208 of minor and major panel folding apparatus 207 can fold a second minor panel of the first box inward towards the center line of the first box.

Moreover, in some embodiments, minor and major panel folding apparatus 207 includes one or more major panel folders 210. One or more major flap folders 210 can be configured to extend outward from minor and major flap folder apparatus 209 toward the first box such that one or more major panel folders 210 can fold the major panels of the first box inward.

In some embodiments, the angle the one or more major panel folders 210 can fold a major panel comprises a range of angles of about 15 degrees to about 90 degrees, encompassing every value in between. For example, in some embodiments the angle to which the one or more major panel folders 210 may fold a major panel may comprise an angle of about 45 degrees. The degree to which a major panel of the first box may depend on the dimension and/or size and/or material quality of the first box.

Furthermore, in some embodiments, one or more major panel lifts 214 being communicatively coupled to control module 110 such that control module can dictate and determine when to active one or more major panel lifts 214 during case assembly. One or more major panel lifts 214 may consist of a group of lift systems of electric linear actuators, hydraulic lifts, pneumatic slides, pulleys, rack and pinions, and/or a combination thereof. As shown in FIG. 7A, in some embodiments, the one or more major panel lifts 214 comprise hydraulic lifts, electric linear actuators, and/or a combination thereof. Alternatively, as shown in FIG. 7B, in some alternative embodiments, the one or more major panel lifts 214 comprise pneumatic slides.

As shown in FIG. 7A, in some embodiments, minor and major panel folding apparatus 207 includes a glue applicator 212 configured to spray at least one portion of an outer surface of the minor panels of the first box. In this manner, the minor panels of the first box are sprayed with a glue substance as the first box is carried by conveyor 112A through opening and folding assembly 200.

In some other embodiments, glue applicator 212 extends out towards the minor panels of the first box and presses against at least one portion of an outer surface of the minor panels of the first box. In some other embodiments, glue applicator 212 is configured to apply a glue substance to at least one portion of an inner surface of the major panels of the first box.

As shown in FIG. 8, in some embodiments, case assembly system 100 comprises compression assembly 300. Compression assembly 300 is configured to interact with the first box carried by conveyor 112A. Additionally, compression assembly 300 is configured such that compression assembly interacts with the first box subsequent to open and folding assembly 200 interacting with the first box.

Moreover, compression assembly includes stops 124B and 124C. Stops 124B and 124C are configured such that they align the leading minor panel of the first box to be perpendicular to the bottom major panel of the first box. In this manner, this configuration ensures that the first box is the squarest to better facilitate the embedding process of embedding assembly 400. Moreover, in some embodiments, the frictional force applied by conveyor 112A and compression roller 130 forces the first box against stops 124B and 124C.

Furthermore, compression assembly 300 includes a compression drive system 302. Compression drive system 302 being mechanically coupled to assembly frame 102 such that compression drive system 302 can be vertically offset from conveyor 112B and/or extend across and over conveyor 112B. In this manner, a second KDF can be carried by conveyor 112B and pass underneath compression drive system 302 without interference.

Figure 9A:
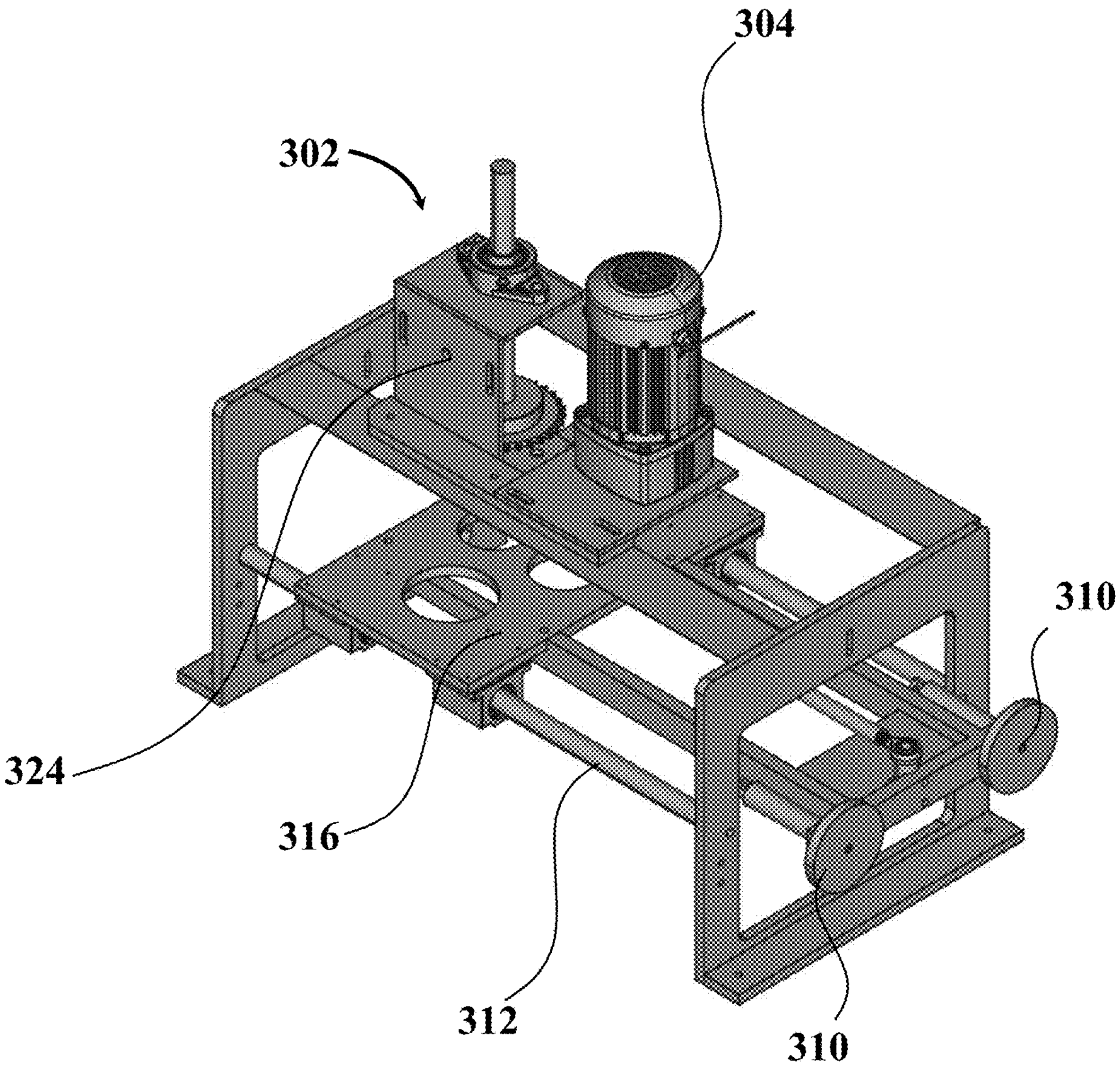
FIG. 9A is a graphical illustration depicting a first isometric view of a compression drive system, according to an embodiment of the present disclosure.
Figure 9B:
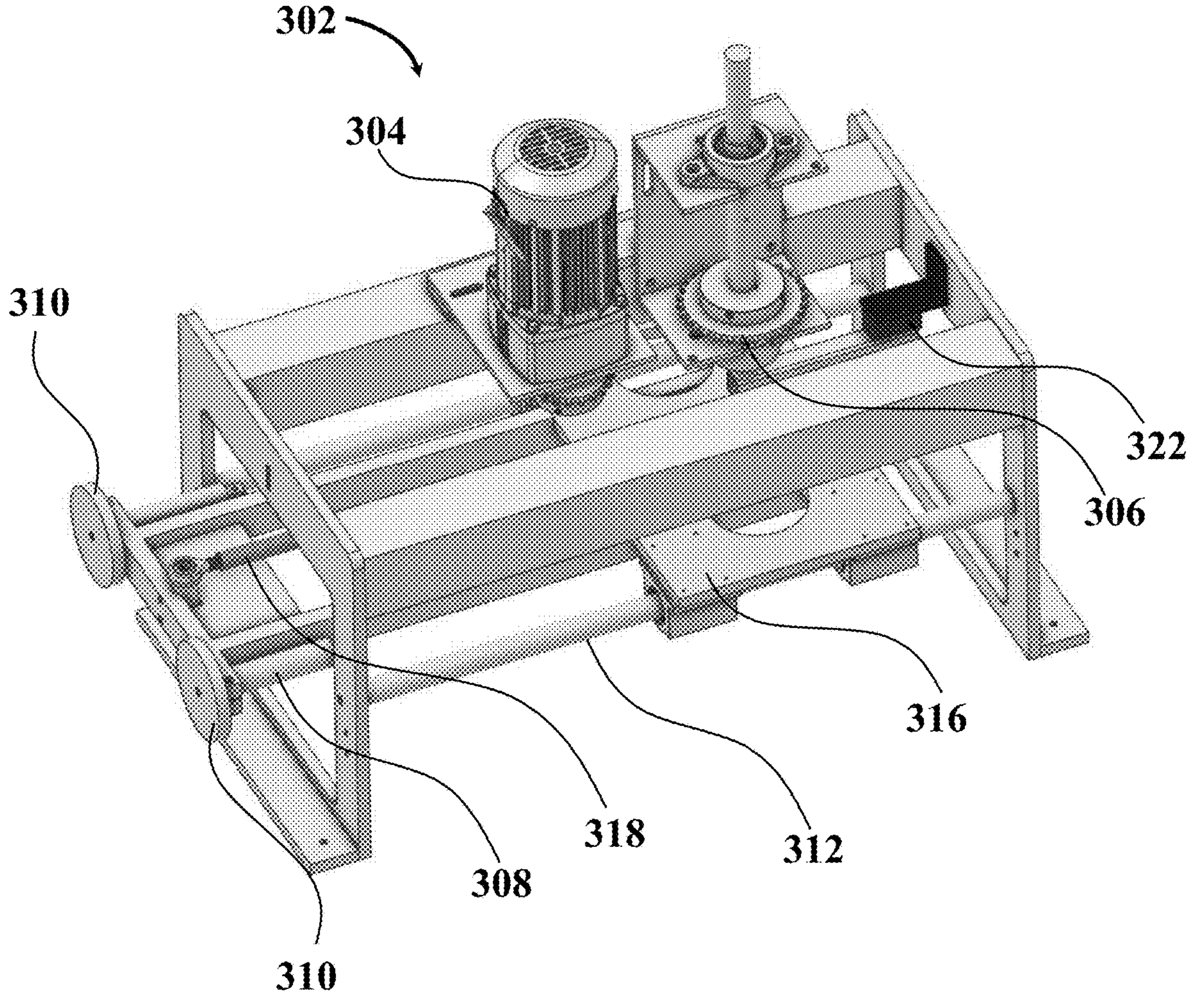
FIG. 9B is a graphical illustration depicting a second isometric view of a compression drive system, according to an embodiment of the present disclosure.
Figure 9C:
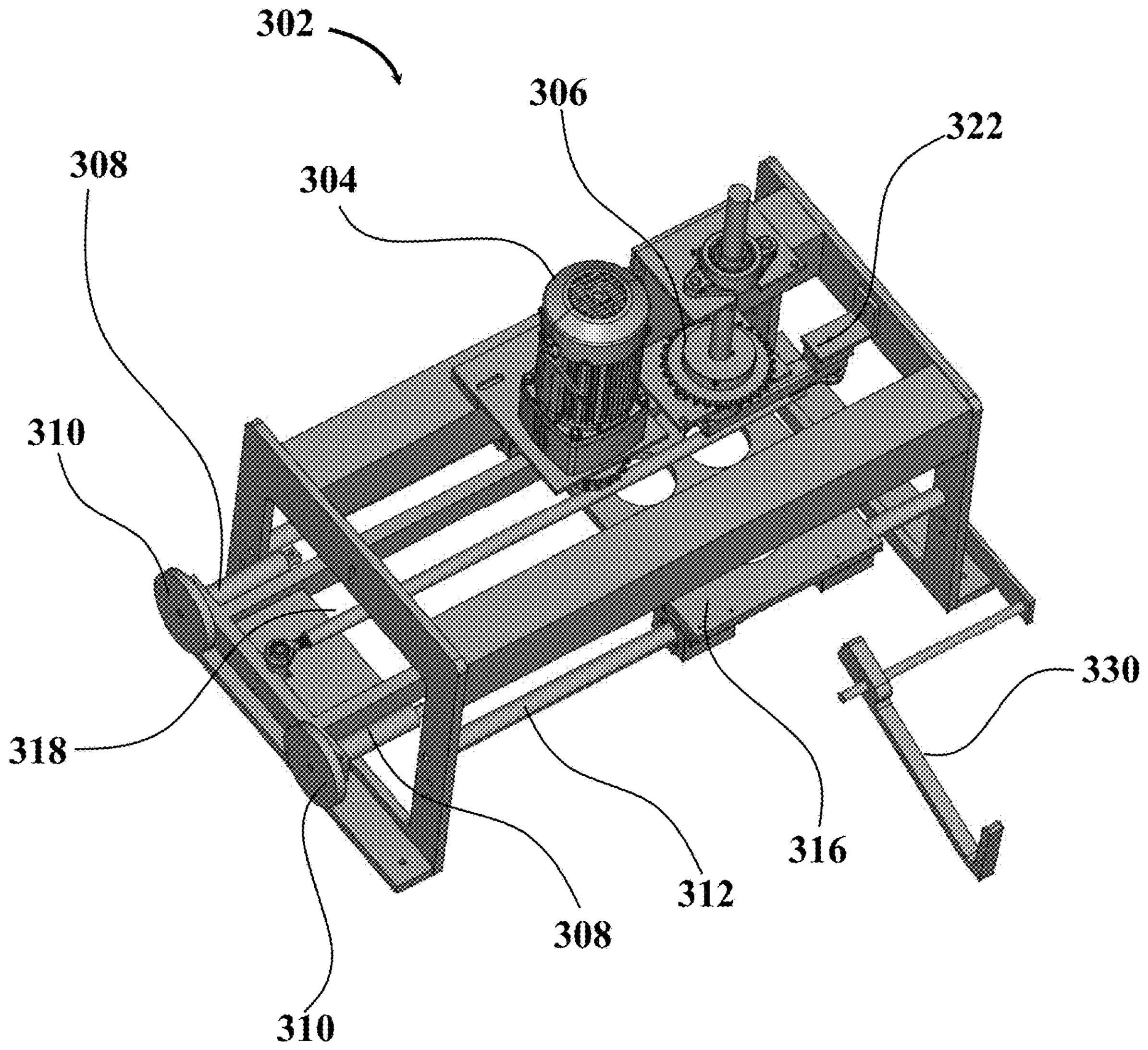
FIG. 9C is a graphical illustration depicting a third isometric view of a compression drive system further comprising a hold down retainer, according to an embodiment of the present disclosure.

As shown in FIGS. 9A-9C, compression drive system 302 comprises a home proximity switch 322 which may be communicatively coupled to control module 110. Furthermore, home proximity switch 1132411 322 can be operatively coupled to a compression drive motor 304. In some embodiments, home proximity switch 322 can receive a communication from control module 110 directing proximity switch to activate compression drive motor 304. Additionally, home proximity switch 322 can be configured to define a retracted position for compression drive system 302.

In some embodiments, compression drive motor 304 is operably coupled to a compression drive crank 306 such that compression drive motor 304 imparts a force onto compression drive crank 306 when home proximity switch 322 is activated.

Additionally, in some embodiments, compression drive crank 306 can be operably coupled with a crank arm 318 such that crank arm 318 rotates in a circular motion when compression drive crank 306 is activated by compression drive motor 304. Moreover, in some embodiments, crank arm 318 is operably coupled to one or more pressure pads 310. Additionally, crank arm 318 is operably coupled to a carriage 316.

Furthermore, carriage 316 can be operably coupled to a guide track 312 such that carriage 316 translates along guide track 312 when compression drive system 302 is activated. In some embodiments, a magnet 320 is operably coupled to compression drive system 302 such that magnet 320 is positioned above the rest position of crank arm 318. In some embodiments, magnet 320 applies a magnetic force onto crank arm 318 such that magnet 320 insures compression drive assembly 302 stops at the retracted position after activation. The retracted position of crank arm 318 being when the crank arm is not extended outward from compression drive system 302, as well as when magnet 320 is positioned directly above crank arm 318.

Furthermore, in some embodiments, home proximity switch 1132411 322 is configured to shut off compression drive motor 304 before crank arm 318 reaches the retracted position. As such, compression drive system 302 is configured such that upon deactivating compression drive motor 304, crank arm 318 will coast and/or glide back to the retracted position after being fully extended. Therefore, crank arm 318 is pulled back to the retracted position by the magnetic force of magnet 320. In this manner, the ability to have crank arm 318 return to a retracted position without the need for a motor and/or servo motor minimizes the down-time between cycles of crank arm 318.

Additionally, crank arm 318 may be configured such that crank arm 318 has a length of about 5 inches to about 16 inches. For example, in some embodiments crank arm 318 comprises a length of about 7 inches. The length of crank arm 318 may depend upon the size and/or dimensions of the first box.

In some embodiments, the one or more pressure pads 310, compression cylinders 308, and/or carriage 316 travel an appropriate distance to ensure a compression force is effectively applied while maintaining clearance for subsequent cycles. In some embodiments, the previously listed components of compression drive 302 travels a distance equal to the depth of the largest possible dimension for the first box and an additional two inches to clear the first box when at the retracted position. The length of crank arm 318 determines the range of the components of compression drive system 302 as described above.

Moreover, the cycle of crank arm 318 and therefore all components operably coupled to crank arm 318 is cyclical such that crank arm 318 does not pause and/or stop at any point during the cycle of crank arm 318. In this manner, crank arms 318 does not stop at its fully extended position in a compression position and moves continuously upon activation by drive motor 304.

As shown in FIGS. 9A-9B, compression drive system 302 includes one or more compression cylinders 308. One or more compression cylinders 308 are operably coupled to carriage 316 and crank arm 318 such that the one or more compression cylinders 308 extend in a direction toward the inner cavity of the first box moving across conveyor 112B to conveyor 112A.

Additionally, the one or more compression cylinders 308 can be operably coupled to an outside regulator such that the outside regulator can adjust the compression force imparted by the one or more compression cylinders 308 to achieve a desired sealing. The exemplary embodiment disclosed herein refers to air regulator, but this description should not be interpreted as exclusionary to other regulators.

In some embodiments, one or more compression cylinders 308 may comprise any form of compression mechanism known in the art. Non-limiting examples of compression mechanisms may include air compressors, hydraulic press, pneumatic bellows, electric actuators, and/or a combination thereof. For ease of reference, the exemplary embodiment disclosed herein refers to air compressors, but this description should not be interpreted as exclusionary to other compression mechanisms.

Moreover, in some embodiments, one or more compression cylinders 308 are mechanically coupled to one or more pressure pads 310 such that one pressure pad of the one or more pressure pads 310 is mounted around the tip of the one or more compression cylinders 308.

One or more pressure pads 310 may have a diameter ranging from about 2 inches to about 8 inches. For example, in some embodiments pressure pads 310 comprise a diameter of about 4 inches. As such, the one or more pressure pads 310 can be configured to only engage and/or compress against the area of the minor panels of the first box where the glue has been applied onto the minor panels of the first box.

In this manner, only the surface area on the opposite side of the minor panels of the first box where the glue has been applied is engaged with one or more pressure pads 310. Moreover, one or more pressure pads 310 are independent of one another meaning that at least one pressure pad 310 can compress at different depths and at different times independently of at least one other pressure pad 310.

As shown in FIG. 9C, in some embodiments, compression drive system 302 includes a hold-down retainer 330. Hold-down retainer 330 comprises a first end and a second end. The first end of hold-down retainer 330 is mechanically coupled to compression drive system 302 such that hold-down retainer 330 extends outward from compression drive system 302 downstream and along the center line of conveyor 112B toward embedding assembly 400. Additionally, the first end of hold-down retainer 330 can be configured to be vertically offset over the center line of conveyor 112B. The second end of hold down retainer 300 being disposed upon the top surface of conveyor 112B in a manner that does not interfere with the multiple strands of round belts of conveyor 112B.

Moreover, in some embodiments, hold-down retainer 330 engages with the second KDF such that it can be lifted as the second KDF passes by hold down retainer 330. In some embodiments, the inertia of the second KDF as it is carried along conveyor 112B is enough to allow the second KDF to lift the second end of hold down retainer 330. As such, hold-down retainer 330 applies a frictional force onto the second KDF such that it minimizes movement or bounce back of the second KDF before arriving at embedding assembly 400 and assists conveyor 112B in moving hold down retainer 330 to embedding assembly 400. Furthermore, hold-down retainer 330 can prevent bounce back of the second KDF as it comes to a stop before embedding assembly 400 by stop 124D.

In some embodiments, stop 124D is activated to rise up and stop the movement of the second KDF just after the second KDF passes under compression drive system 302. Therefore, stop 124D stops the movement of the second KDF before reaching embedding assembly 400. At this moment, hold down retainer 330 applies a frictional force on the second KDF to prevent bounce back and/or other movements by the second KDF when it abuts against stop 124D. At this moment, hold-down retainer 330 and stop 124D work in tandem to prepare the second KDF by ensuring the second KDF is still correctly aligned and hold it in position for the correct timing before moving onto embedding assembly 400 to ensure the first and second KDF reach embedding assembly 400 at the correct time to maximize efficiency.

In some embodiments, the design of hold-down retainer 330 is based on the pivot point of second KDF opening apparatus 415 being in close proximity of alignment with the rear folding point of the second KDF. Unfortunately, this location is a moving target with the poor-quality control from the KDF corrugators. Any deviation from the design dimensions of the KDF causes opening vacuum cups 416 and/or stabilizing vacuum cup 418 to attach to the second KDF at a different point from the design, thereby resulting in jams in this opening area.

Therefore, in some embodiments, to overcome this issue hold-down retainer 330 having a unique shape as shown in FIG. 9C. This shape allows the second KDF to engage hold down retainer 330 to be lifted up by the second KDF before stop 124D (i.e., prevents drag when stop 124D is removed for advancing) and puts more friction between the second KDF and conveyor 112B to drive the second KDF to discharge stop 430 and prevent bounce back.

Moreover, the height of hold down retainer 330 keeps the second KDF in position for opening thereby allowing deviations in the second KDF. When the second KDF is opened, the friction on conveyor 112B created by hold-down retainer 330 pulls the opened second box top forward until it encounters flip-up stop 424. Flip-up stop 424 aligns the second box within range of top corner guides 408 and bottom corner guides 412.

Figure 10:
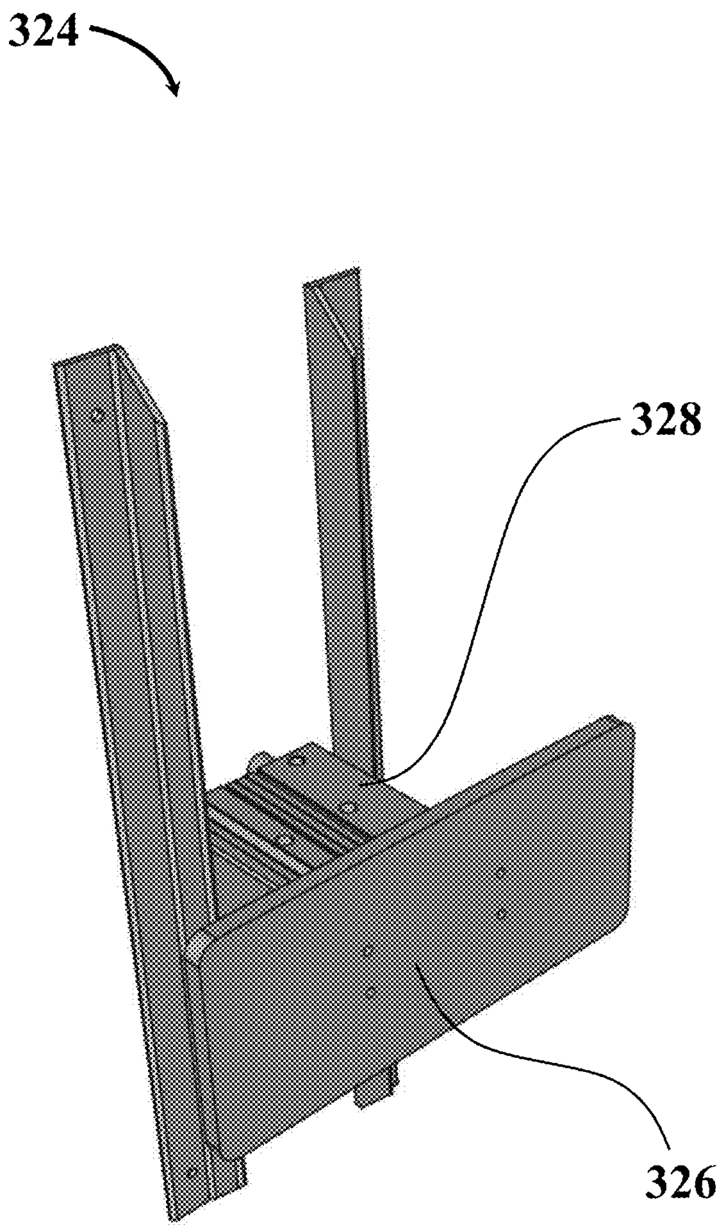
FIG. 10 is a graphical illustration depicting an isometric view of a back plate apparatus, according to an embodiment of the present disclosure.

As shown in FIG. 10, in conjunction with FIG. 8, compression assembly 300 includes a back plate apparatus 324 mechanically coupled to assembly frame 102. Back plate apparatus 324 is positioned along conveyor 112A at the exact same location where compression drive system 302 is positioned over conveyor 112B.

As shown in FIG. 10, back plate apparatus 324 includes a back plate pneumatic slide 328. Back plate pneumatic slide 328 is mechanically coupled to assembly frame 102. Additionally, back plate pneumatic slide 328 can be communicatively coupled to control module 110. Furthermore, back plate apparatus 324 comprises a back plate 326 operably coupled to back plate pneumatic slide 328.

Moreover, in this manner, when back plate pneumatic slide 328 is activated by control module 110, back plate pneumatic slide 328 will extend back plate 326 outward in a direction towards the major and minor panels of the first box and come into contact with at least one portion of the outer surface of the major panels of the first box. Back plate apparatus 324 can apply a directional force and press against the major panels of the first box such that they fold about another forty-five degrees until major panels come into contact with the folded minor panels of the first box. As such, the compression of the major panels of the first box against the minor panels of the first box creates a seal and forms a bottom of the first box.

As shown in FIGS. 8A-8B in conjunction with FIG. 1A, in some embodiments, compression assembly 300 is configured to compress and/or seal the major panels and minor panels of the first box. During operation of case assembly system 100, the first box will be carried by conveyor 112A to compression assembly 300 subsequent to opening and folding assembly 200. As described above, stops 124B and 124C prevent the first box from further traveling along conveyor 112A when activated such that the first box is aligned between compression drive system 302 and back plate apparatus 324.

Furthermore, compression drive system 302 and back plate apparatus 324 can be activated by control module 110 simultaneously. As such, the one or more pressure pads 310 and compression cylinder 308 can press against the inner surface of the minor panels of the first box at the same moment back plate 326 of back plate apparatus 324 presses against the outer surface of the major panels of the first box. At this point, carriage 316, one or more pressure pads 310, and one or more compression cylinders 308 are at a maximum travel position. The one or more compression cylinders 308 having at least a one-inch stroke allows for the one or more compression cylinders 308 to collapse. At the maximum travel position, backplate 326 compresses against the major panels of the first box in such a manner that it imparts a force against the previously described components of compression drive system 302. As such, this force causes the one or more compression cylinders 308 to collapse.

In some embodiments, the amount the one or more compression cylinders 308 may collapse comprises of a range of about 0.3 inches to about 1 inch. For example, in some embodiments, the amount the one or more compression cylinders 308 collapses by is about 0.88 inches. The compression pressure is adjustable via the regulator supplying pressure to the one or more compression cylinders 308. This compression of one or more compression cylinders 308 creates the seal and/or compression time wherein the seal and/or dwell time is the time it takes for the minor and major panels of the first box to be sealed together, forming a bottom of the first box.

Compression cylinders 308 do not simply make contact and retract but instead collapse during compression. This collapse of compression cylinders 308 creates a dwell and/or seal time, allowing the glue to set and form a proper seal before the first box moves to the next stage and/or assembly. The force applied to compression cylinders 308 is always less than the force applied by back plate apparatus 326, ensuring that compression cylinders 308 collapse in a controlled manner rather than resisting the compression. Compression cylinders 308 do not simply make contact and retract; instead, they compress further under applied force to ensure proper sealing.

The motion path of crank arm 318 follows a circular trajectory with a chordal deviation at the end of the stroke. Crank arm 318 completes a 360-degree motion cycle, causing carriage 316 to move and thereby allowing the one or more compression cylinders 308 to extend outward until contacting the minor panels. As crank arm 318 follows a circular motion path, carriage 316 moves forward along guide track 312.

Upon contact, one or more compression cylinders 308 collapse and one or more pressure pads 310 remain engaged, sustaining the compression force for the duration of the seal (i.e., "dwell") time. This controlled collapse ensures that the glue adhesive is adequately compressed and mitigates potential issues with incomplete sealing.

The regulator is consistently set to a lower force than the slide force of carriage 316 as it slides towards the first box. In this manner, the regulator applying a lesser force than the force of sliding carriage 316 allows carriage 316 to facilitate a gradual collapse instead of an abrupt impact. Preventing excessive stress on box material and structure while maintaining the structural integrity of the seal.

Moreover, the pressing of the major panels by back plate apparatus 326 and pressing of the minor panels by compression drive system 302 creates a seal between the major panels and the minor panels of the first box with the glue substance sprayed onto the minor panels of the first box acting as the adhesive. The sealing of the minor panels and the major panels of the first box forms the bottom of the first box.

Figure 11:
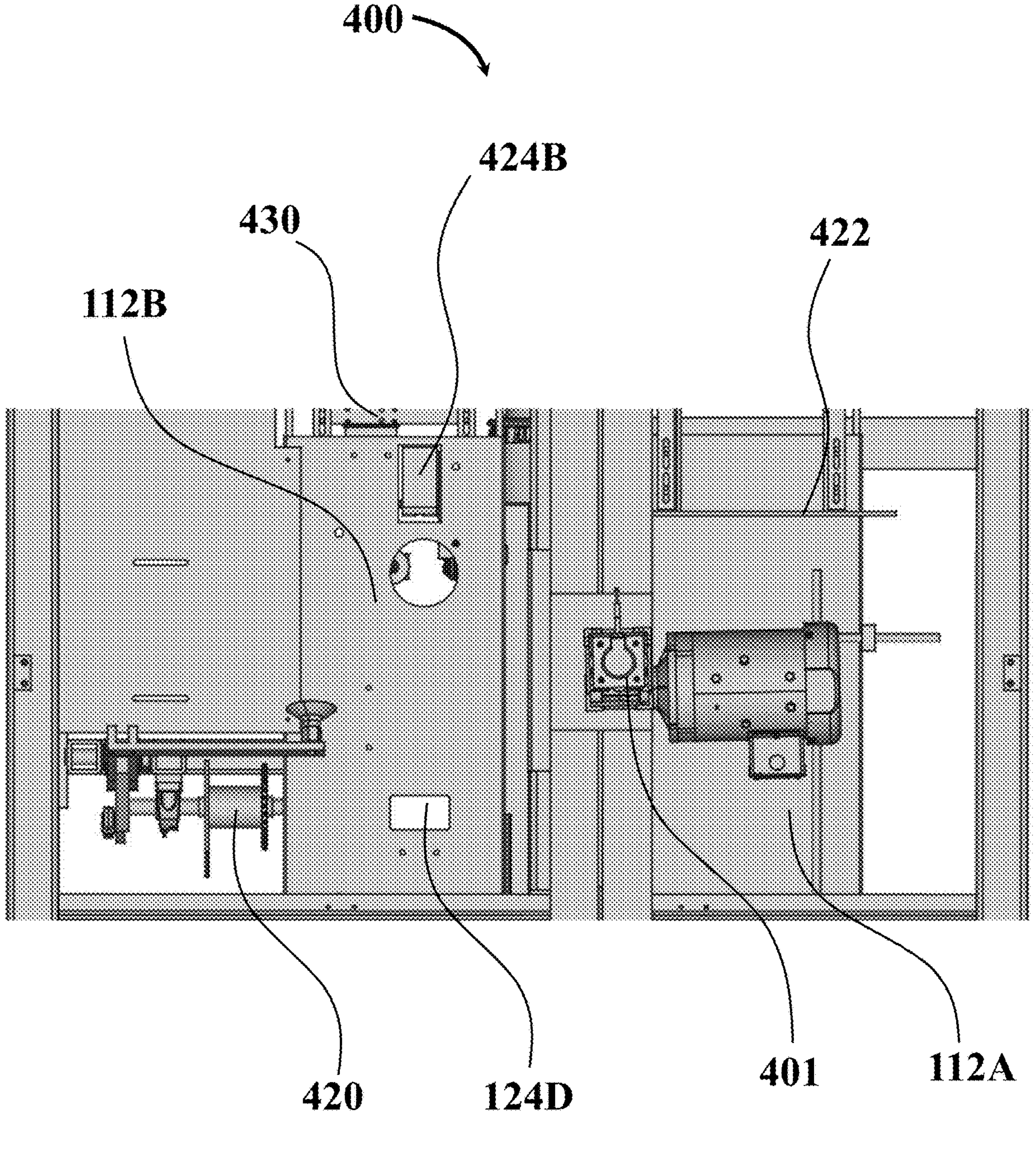
FIG. 11 is a graphical illustration depicting a top-down view of an embedding assembly, according to an embodiment of the present disclosure.

As shown in FIG. 11, in conjunction with FIGS. 1A-1C, case assembly system 100 includes an embedding assembly 400. Embedding assembly 400 is configured to interact with the first box carried by conveyor 112A subsequent to open and folding assembly 200 and compression assembly 300. Furthermore, embedding assembly 400 is configured to interact with the second KDF carried on conveyor 112B. The second KDF traveling on conveyor 112B may not interact with opening and folding assembly 200 and/or compression assembly 300.

In some embodiments, the second KDF interacts with stop 124D and hold down retainer 330 before moving onto embedding assembly 400. In this manner, hold down retainer and stop 124D are configured to minimize bounce back or misalignment of the second KDF before arriving to embedding assembly 400. Stop 124D is configured to prevent the second KDF from arriving to embedding assembly 400 before the appropriate moment such that error and misalignment between the first and second boxes is minimized during the embedding process.

As shown in FIG. 11, embedding assembly 400 comprises a discharge stop 430. Discharge stop 430 is operably coupled assembly frame 102 such that discharge stop is positioned near the end of conveyor 112B. Moreover, discharge stop 430 is configured to prevent the second KDF from being carried away from conveyor 112B onto discharge belt 106 when activated.

In some embodiments, a sensor of the series of sensors is positioned along conveyor 112B along embedding assembly 400. The sensor is configured to detect the presence of the second KDF as it is carried to embedding assembly 400. Upon detection of the second KDF, the sensor of the series of sensors may electronically communicate with control module 110 or with discharge stop 430 to activate discharge stop 430. In this manner, discharge stop 430 activated will rise in a vertical manner perpendicular to conveyor 112B to prevent second KDF from leaving the embedding area.

Figure 15:
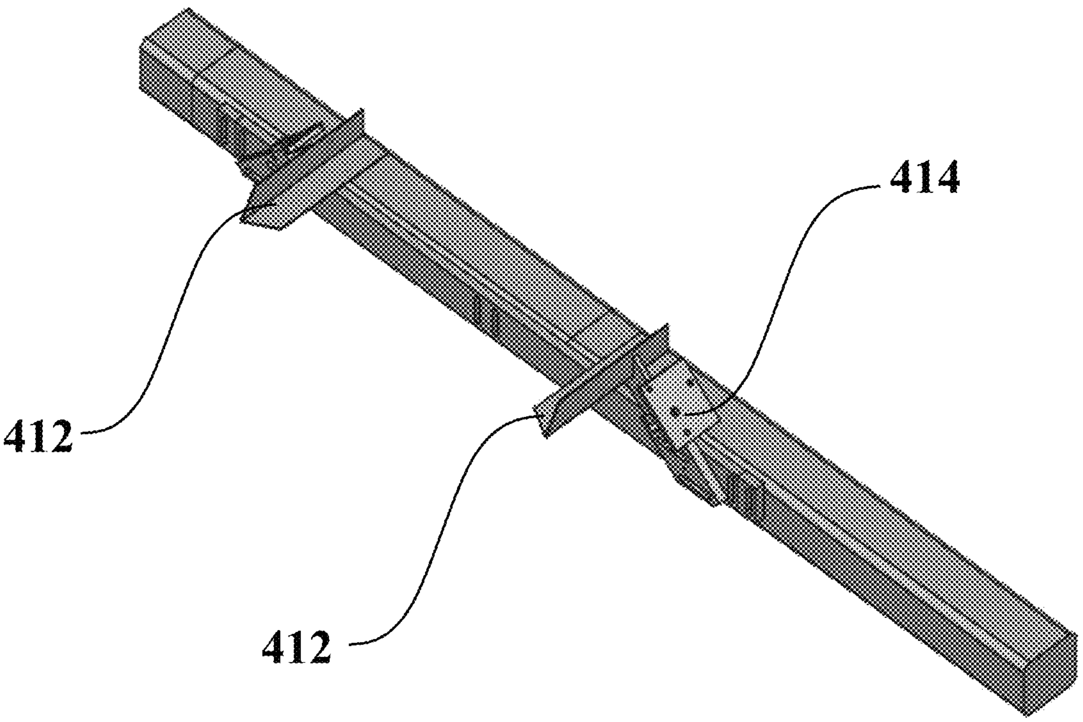
FIG. 15 is a graphical illustration depicting an isometric view of one or more bottom corner guides, according to an embodiment of the present disclosure.

As shown in FIG. 15, in conjunction with FIG. 11, embedding assembly 400 includes a second KDF opening apparatus 415 mechanically coupled to assembly frame 102. Moreover, second KDF opening apparatus 415 may be disposed about conveyor 112B.

Furthermore, second KDF opening apparatus 415 comprises an opening vacuum cup 416. Opening vacuum cup 416 moves and performs the same function as the one or more vacuum cups 202 of first KDF opening apparatus 201 as described above. Upon activation of the second KDF opening apparatus 415, opening vacuum cup 416 is lowered from a rest position to a coupling position.

As described above for first KDF opening apparatus 201, the velocity at the rest position and coupling position of opening vacuum cup 416 is zero such that opening vacuum cup may for a vacuum tight seal with at least one portion of a surface of the second KDF. Moreover, in this manner, the second KDF is lifted into an open position when opening vacuum cup 416 moves back into the rest position. In the open position, the second KDF becomes the second box. Additionally, opening vacuum cup 416 maintains the vacuum seal along a side of the second box until completion of the embedding process.

As depicted in FIG. 15, in conjunction with FIG. 11, second KDF opening apparatus 415 comprises a stabilizing vacuum cup 418. In some embodiments, stabilizing vacuum cup 418 rises through an opening of conveyor 112B upon activation and operably couple to a bottom side of the second KDF during activation of second KDF opening apparatus 415. Stabilizing vacuum cup 418 performs the same vacuum sealing ability as opening vacuum cup 416 as described above.

In some embodiments, stabilizing vacuum cup 418 presses against the second KDF in such a manner in which a vacuum seal is created preventing second KDF from traveling along conveyor 112B. Stabilizing vacuum cup 418 is configured to remain active until the end of the embedding process.

Additionally, in some embodiments, stabilizing vacuum cup 418 can be mechanically coupled to a lobe cam 420. Lobe cam 420 may be operably coupled to second KDF opening apparatus 415. Lobe cam 420 is configured to move and/or pivot stabilizing vacuum cup 418 to the appropriate opening of conveyor 112B. In this manner, activation of KDF opening apparatus 415 activated lobe cam 420 such that it pivots stabilizing vacuum cup 418 from a rest position underneath conveyor 112B to a stabilizing position.

Moreover, in some embodiments, the second end of hold down-retainer 330 is configured to still be disposed upon the top of the second KDF before it the second KDF is lifted by second KDF opening apparatus 415. At this point, the second end of hold-down retainer 330 is configured to rest at a pivot point of the second KDF. A pivot point of the second KDF being the fold point between two sides of the second KDF that are configured to rise up and form two sides of the second KDF box when raised into an open position.

Additionally, as shown in FIG. 15 in conjunction with FIG. 9C, in some embodiments, the second end of hold down retainer 330 comprises a vertical head. The vertical head is configured to assist in ensuring the newly opened second box remains in the ideal position for the embedding process. The vertical head is configured to ensure that different and/or varying sizes of boxes can be embedded. Moreover, the vertical head of hold down retainer 330 is configured to assist and hold boxes that are off spec in position for embedding. The height of the vertical head of the second end of hold down retainer 330 comprises a heights ranging from about 1.5 inches to about 6 inches. For example, in some embodiments, the height of the vertical head of the second end of hold down retainer 330 comprises about 3 inches.

In some embodiments, the second box is configured such that the major and minor panels of the second box extend in an outward direction away from the center line of case assembly system 100. Moreover, the major and minor panels of the second box are configured to point in the opposite direction as the major and minor panels of the first KDF were pointing before folding by opening and folding assembly 100.

Figure 19:
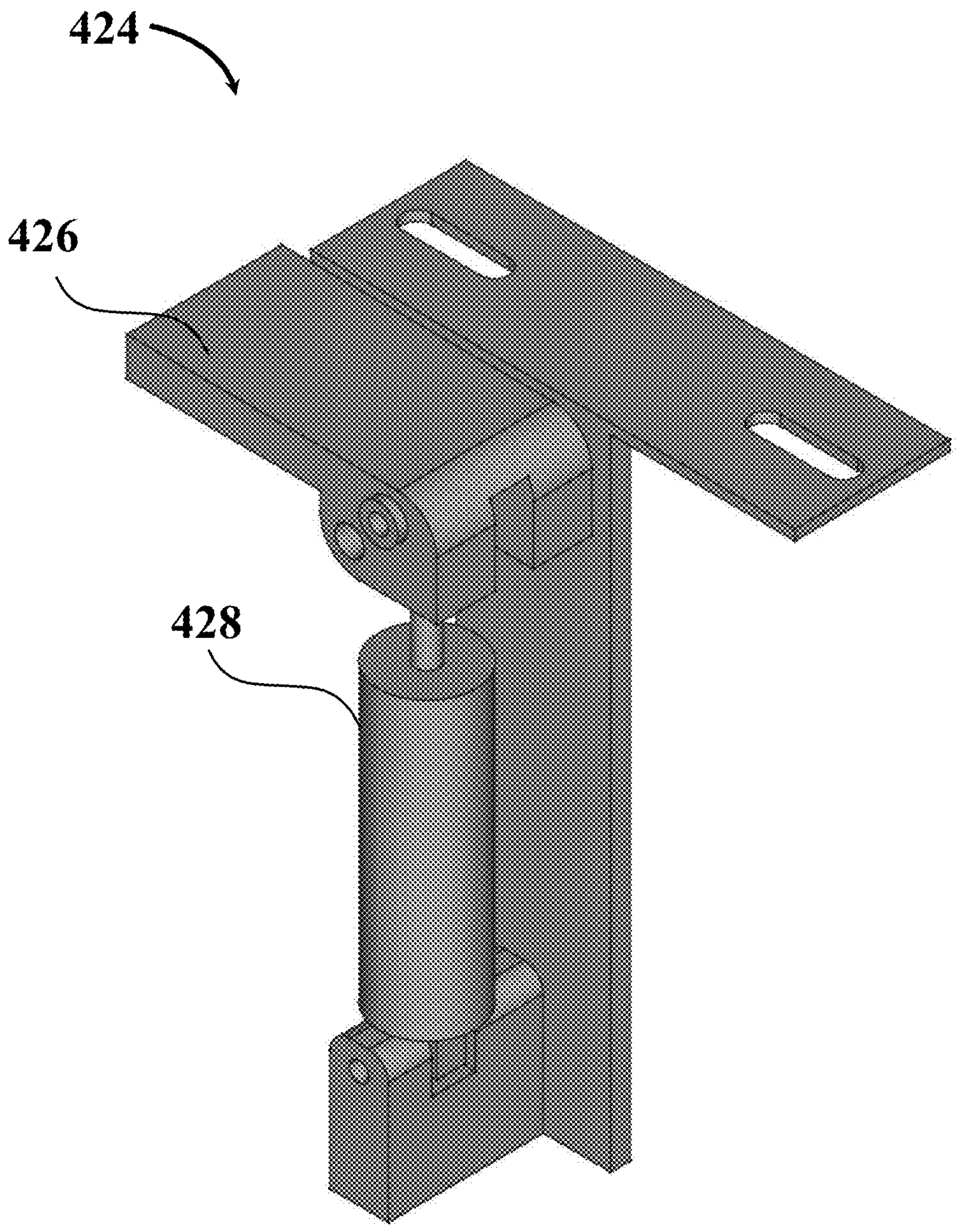
FIG. 19 is a graphical illustration depicting an isometric view of a flip-up stop, according to an embodiment of the present disclosure.

As shown in FIG. 11, in conjunction with FIG. 19, embedding assembly 400 further comprises a flip-up stop 424 mechanically coupled to at least one surface of conveyor 112B. In this manner, flip-up stop 424 is mechanically coupled to conveyor 112B so that it is in the middle of conveyor 112B and flush against the top surface of conveyor 112B. Additionally, flip-up stop 424 may be communicatively coupled with a sensor of the one or more sensors and/or with control module 110.

In some embodiments, flip-up stop 424 includes a block plate 426. Block plate 426 is configured to rise from a rest position to a blocking position during activation of flip-up stop 424. As such, the blocking position prevents the second box from being carried further by conveyor 112B to discharge belt 106 after the second KDF is opened by second KDF opening apparatus 415. Furthermore, flip-up stop 424 further comprises a block lift 428 operably coupled to block plate 426. In this manner, during activation of flip-up stop 424, block lift 428 can raise block plate 426 from the rest position to the blocking position.

Moreover, flip-up stop 424 can be configured to activate upon the transformation of the second KDF into the second box. In this manner, a sensor of the one or more sensors can be configured about embedding assembly 400 and conveyor 112B such that is detects the presence of the second KDF opening up and becoming the second box.

Upon this detection, the sensor of the one or more sensors being communicatively coupled to control module 110 can communicate with control module 110 causing the activation of flip-up stop 424. In some alternative embodiments, the sensor of the one or more sensors can be communicatively coupled to flip-up stop 424. Upon the completion of the embedding process and formation of a completed assembly, flip-up stop 424 can be lowered back to a rest position allowing the completed assembly to travel outside case assembly system 100.

As best shown in FIGS. 1A-1C, the first box can be carried by conveyor 112A from compression assembly 300 to embedding assembly 400. In some embodiments, the major and minor panels of the first box are folded and sealed such that a bottom surface of the first box is formed. In some embodiments, the first box now has an inner cavity and a bottom surface.

Figure 12:
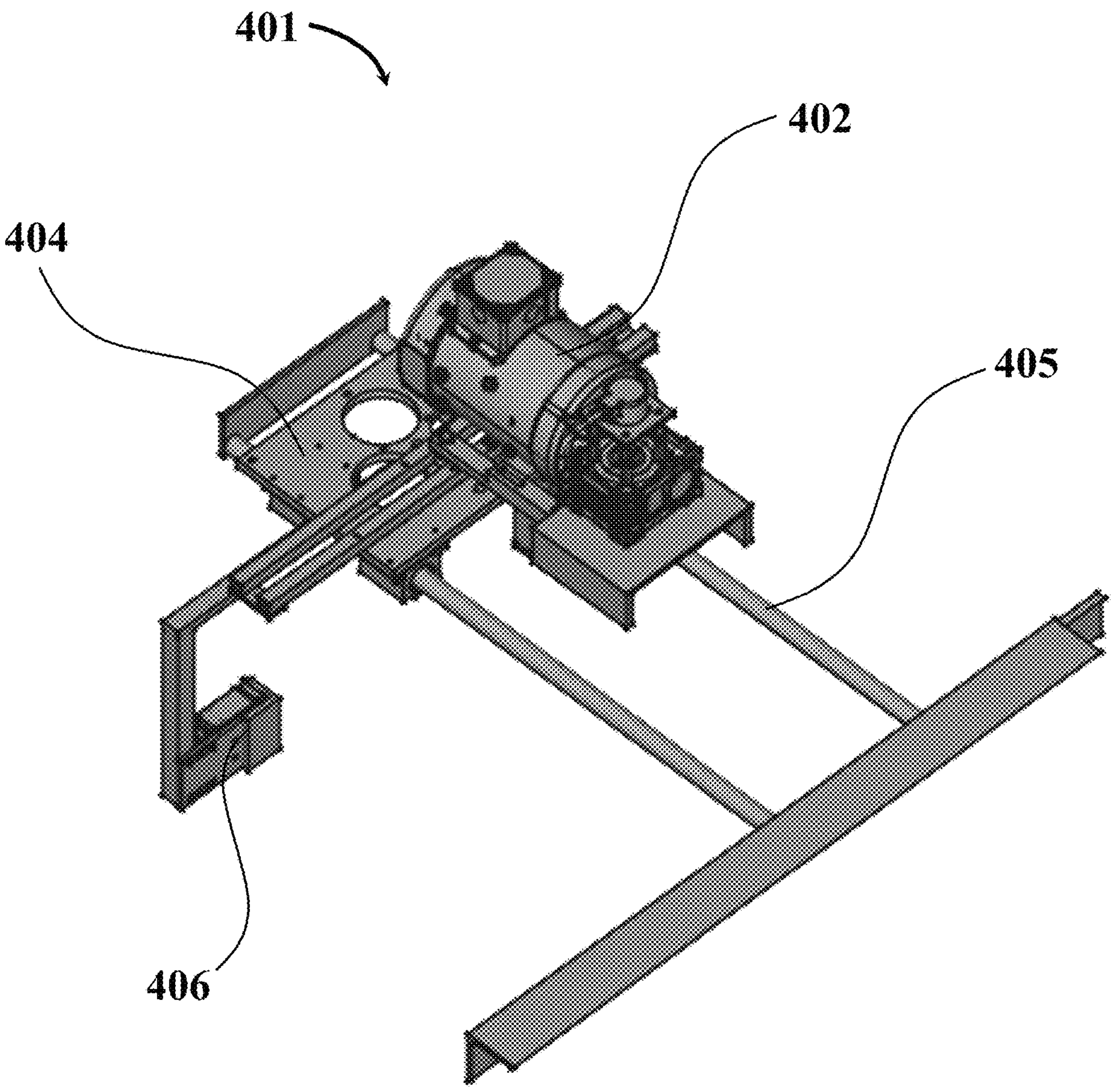
FIG. 12 is a graphical illustration depicting an isometric view of an embedding apparatus, according to an embodiment of the present disclosure.

As depicted in FIG. 11, in conjunction with FIG. 12, in some embodiments, embedding assembly 400 comprises an embedding apparatus 401. Embedding apparatus 401 being mechanically coupled to assembly frame 102 such that embedding apparatus 401 can be disposed about conveyors 112A and 112B.

Moreover, in some embodiments, embedding apparatus 401 comprises an embedding apparatus motor 402 mechanically coupled to assembly frame 102. Additionally, embedding apparatus motor 402 can be communicatively coupled with control module 100 such that control module 100 may activate and coordinate the initiation and end of embedding apparatus motor 402 and embedding apparatus 401.

Additionally, in some embodiments, embedding apparatus 401 further comprises an embedding carriage 404 operably coupled to embedding apparatus motor 402. Additionally, embedding carriage 404 can be operably coupled to an embedding apparatus track 405.

In some embodiments, embedding apparatus track 405 is mechanically coupled to assembly frame 102. Moreover, embedding apparatus track 405 extends across both conveyors 112A and 112B. In this manner, embedding carriage 404 can be configured such that upon activation of embedding apparatus motor 402, embedding carriage 404 can translate along embedding apparatus track 405 between conveyors 112A and 112B.

Furthermore, embedding apparatus comprises of one or more embedding guides 406. The one or more embedding guides 406 are mechanically coupled to embedding carriage 404. Additionally, the one or more embedding guides 406 can be communicatively coupled to control module 110.

Figure 13A:
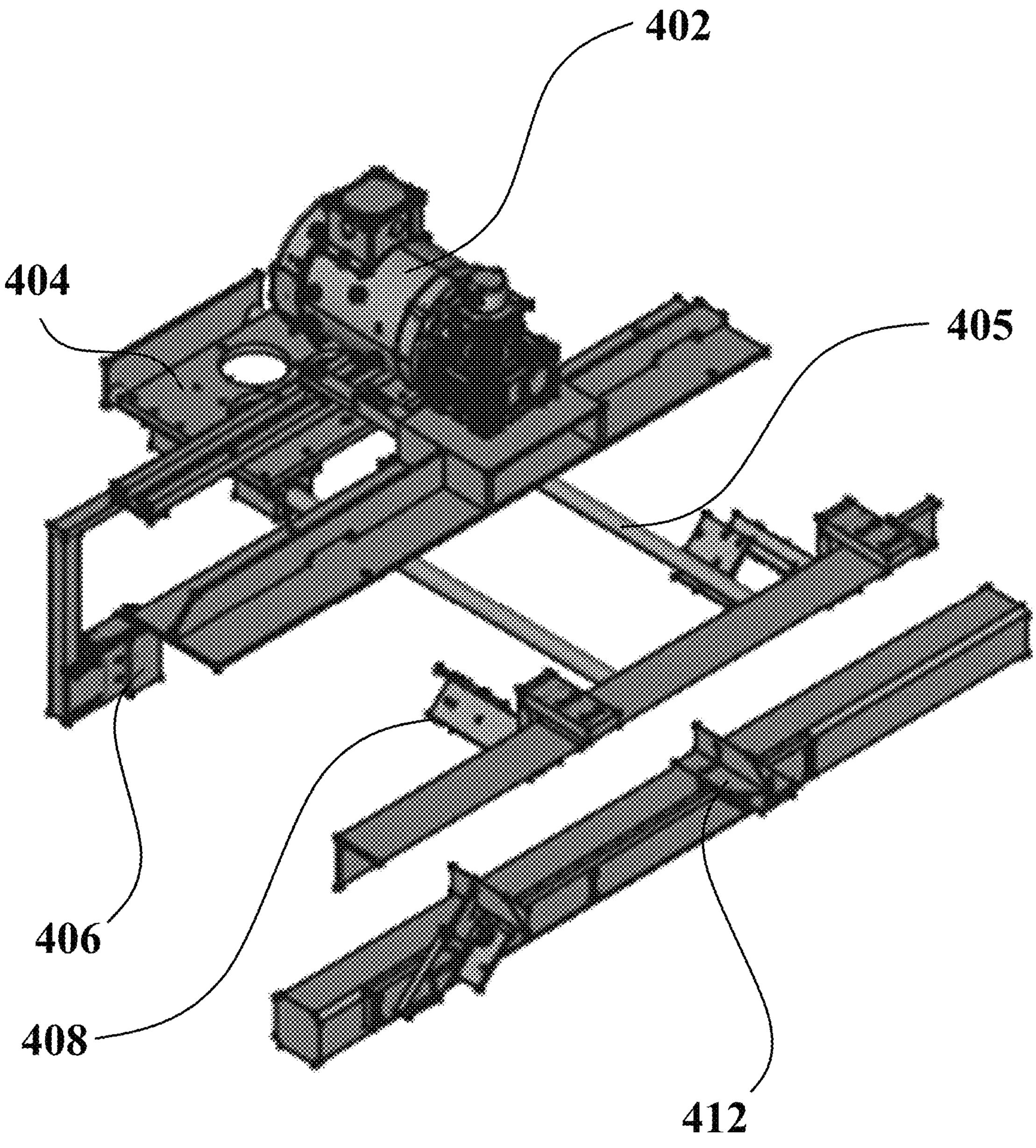
FIG. 13A is a graphical illustration depicting a first isometric view of an embedding apparatus, one or more top corner guides, one or more bottom corner guides of an embedding assembly, according to an embodiment of the present disclosure.
Figure 13B:
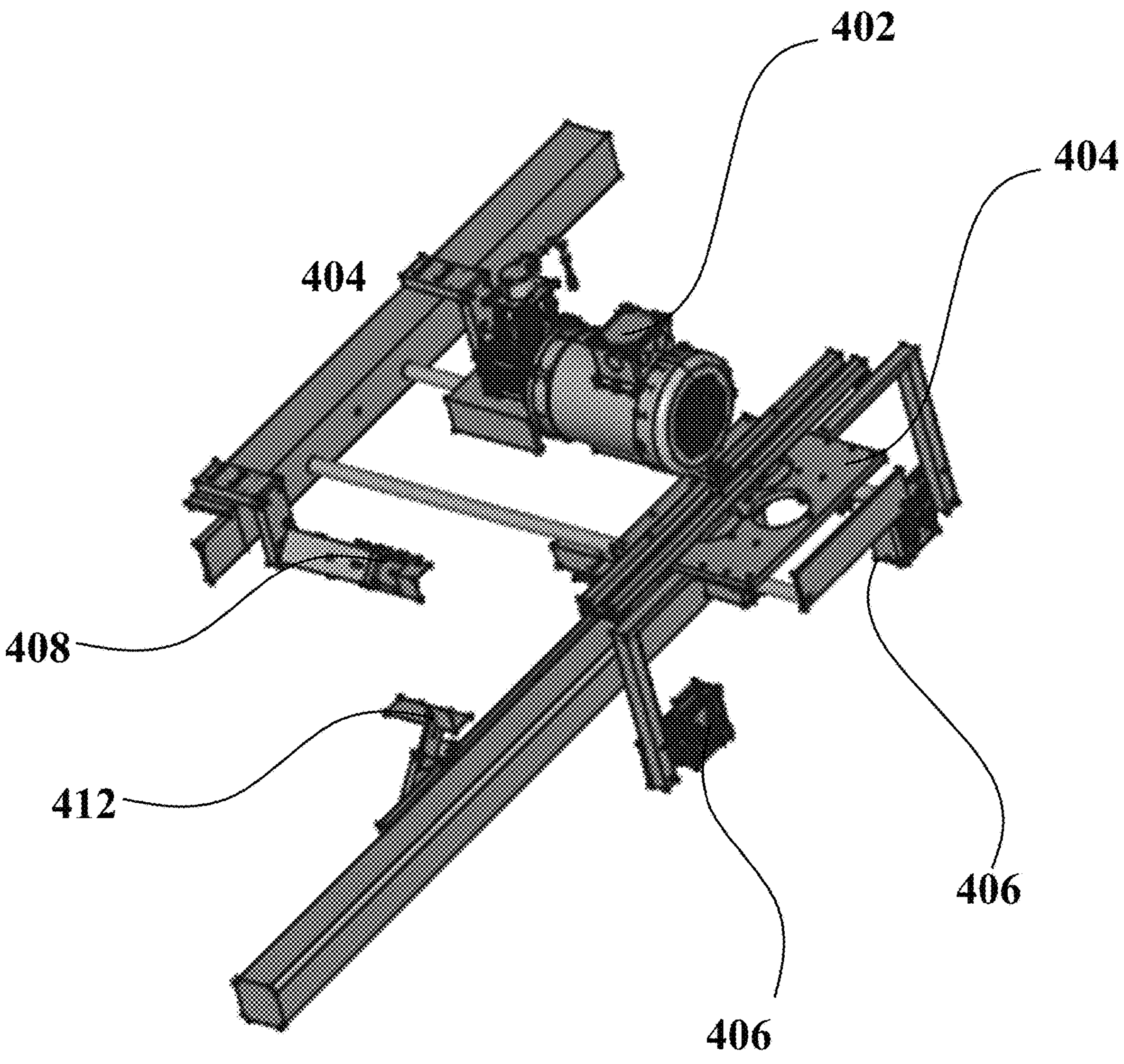
FIG. 13B is a graphical illustration depicting a second isometric view of an embedding apparatus, one or more top corner guides, one or more bottom corner guides, of an embedding assembly, according to an embodiment of the present disclosure.
Figure 14:
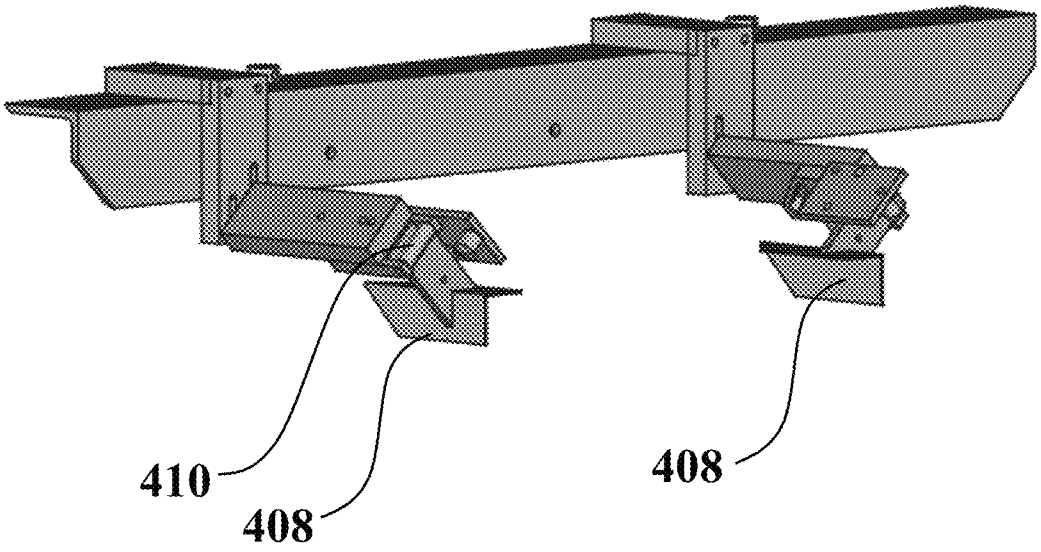
FIG. 14 is a graphical illustration depicting an isometric view of one or more top corner guides, according to an embodiment of the present disclosure.

As shown in FIG. 14, in conjunction with FIGS. 13A-13B, embedding assembly 400 includes one or more top corner guides 408. The one or more top corner guides 408 are operably coupled to one or more rotatable pivots 410. In some embodiments, the one or more rotatable pivots 410 are mechanically coupled to assembly frame 102 such that one or more rotatable pivots 410 are positioned between conveyors 112A and 112B in a vertical offset position from conveyors 112A and 112B. The one or more rotatable pivots 410 may allow for at least 25 degrees of rotation from a resting position.

Furthermore, in some embodiments, the one or more top corner guides 408 are configured to rotate into a position inside the top corners of the second box. As such, the one or more top corner guides 408 slide into the second box and against the inner surface of the top corners of the second box by the first box being pushed by embedding apparatus 401. In this manner, the opening of the second box is increased and/or allowing for easier embedding and/or nesting of the first box into the second box.

In some other embodiments, the one or more top corner guides 408 can be flipped around such that the one or more top corner guides 408 perform the opposite function as described above. The one or more top corner guides 408 may press against the outer surface of the top corners of the second box to minimize the size of the second box allowing for the embedding apparatus to embed the second box into the first box.

As shown in FIG. 14, in conjunction with FIG. 13A-13B, embedding assembly 400 comprises one or more bottom corner guides 412. The one or more bottom corner guides 412 being operably coupled to one or more rotatable pivots 414. In some embodiments, the one or more rotatable pivots 414 are mechanically coupled to assembly frame 102 such that one or more rotatable pivots 414 are positioned between conveyors 112A and 112B.

The one or more bottom corner guides 412 perform the same function as the one or more top corner guides 408 as described above for the bottom corner of the second box. The one or more rotatable pivots 414 may allow for at least 25 degrees of rotation from a resting position.

In some other embodiments, the one or more bottom corner guides 412 can be flipped around such that the one or more bottom corner guides 412 perform the opposite function as described above. The one or more bottom corner guides 412 may press against the outer surface of the bottom corners of the second box to minimize the size of the second box allowing for the embedding apparatus to embed the second box into the first box.

Additionally, the one or more bottom corner guides 412 are configured to slide into a position inside the bottom corners of the second box such that the opening of the second box increased and/or allowing for easier embedding and/or nesting of the first box into the second box.

Moreover, one or more embedding guide devices 406 is configured such that a pushing plate may extend out from each of the one or more embedding guide devices 406 during the embedding process. The one or more embedding guide devices 406 press against the bottom surface of the first box and apply a directional force against the bottom surface of the first box towards the second box.

In some embodiments, embedding assembly 400 is configured to embed the first box into the second box forming a completed assembly. In some other embodiments, embedding assembly 400 can be configured such that the second box is embedded into the first box forming a completed assembly. In this manner, the one or more top corner guides 408 and one or more bottom corner guides 412 may be reconfigured and perform the opposite function as described above.

Furthermore, in some embodiments, embedding assembly 400 comprises a top stabilizing beam. The top stabilizing beam being mechanically coupled to assembly frame 102. Additionally, the top stabilizing beam is vertically offset over the center line of conveyor 112B. In this manner, the top stabilizing beam can assist in the embedding process such that when the second box KDF is raised into an open position, forming the second box, the top stabilizing beam contacts the top surface of the second box.

Moreover, the top stabilizing beam can provide an additional frictional force to the second box such that top stabilizing beam prevents movement or misalignment of the second box during the embedding process. Furthermore, the top stabilizing beam can be adjusted such that the top stabilizing beam can be lowered and/or raised depending on the dimensions and/or size of the second box.

As shown in FIG. 11, embedding assembly 400 may further comprise a guide rail 422. Guide rail 422 may be configured such that guide rail 422 may prevent the first KDF from further traveling along conveyor 112A. Guide rail 422 may further ensure accurate alignment between the first KDF and the second KDF for the embedding process.

In some embodiments, embedding assembly 400 includes an embedding stabilizer. The embedding stabilizer being operably coupled to assembly frame 102. Moreover, the embedding stabilizer is positioned adjacent to second KDF opening apparatus 415.

Additionally, the embedding stabilizer comprises a stabilizing plate. The stabilizing plate of the embedding stabilizer extends outward in a direction towards the center line of assembly frame 102. In this manner, upon activation by control module 110, the stabilizing plate of the embedding stabilizer extends outward towards the second box during the embedding process. As such, the stabilizing plate presses against a minor and/or major panel of the second box to provide a direction force in a direction against the force being applied by embedding apparatus 401. Embedding stabilizer ensures a stabilizing force is applied onto all sides of the second box during the embedding process.

Method for Forming a Case Assembly

Figure 20:
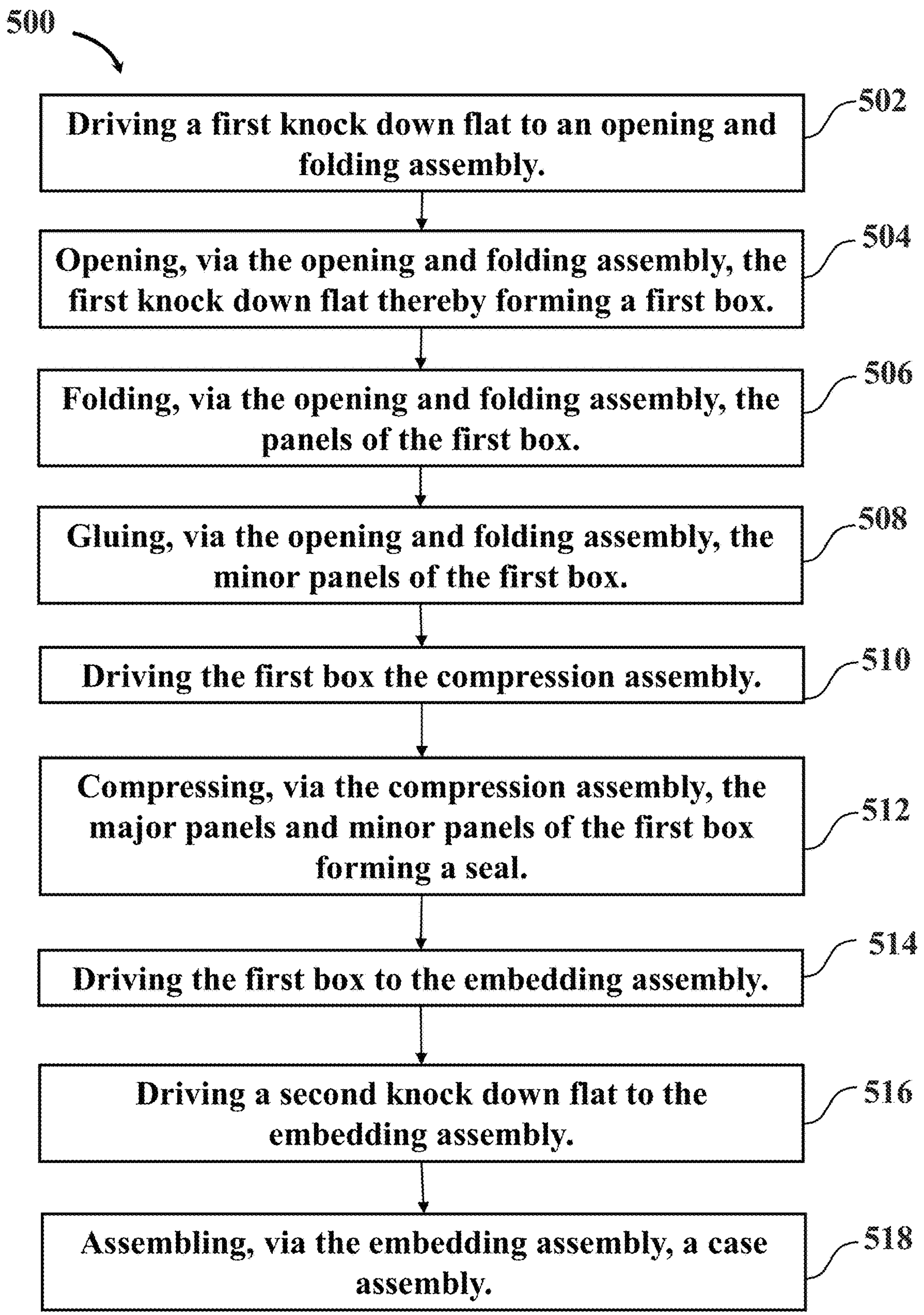
FIG. 20 is a flow chart depicting a method for forming a case assembly utilizing a case assembly system, according to an embodiment of the present disclosure.

Referring now to FIG. 20, in conjunction with FIGS. 1A-1C, a method is depicted for forming a case assembly utilizing a case assembly system 100. The steps delineated are merely exemplary of a preferred order for forming a case assembly utilizing a case assembly system 100. The steps may be carried out in another order, with or without additional steps included therein. Additionally, the steps may be carried out with alternative embodiments of the case assembly system 100, as contemplated in the above description.

As shown in FIG. 20, in conjunction with FIGS. 1A-1C, the method for forming a case assembly via a case assembly system 100 begins with step 502, driving a first KDF to an opening and folding assembly 200. The next step, step 504, comprises opening, via opening and folding assembly 200, the first KDF. Upon opening the first KDF, the first KDF transitions to become the first box. At step 506, the major and minor panels of the first box are folded via opening and folding assembly 200. Next, and subsequently at step 508, the minor panels of the first box are glued via opening and folding assembly 200.

Referring again to FIG. 20, in conjunction with FIGS. 1A-1C, next, method 500, may proceed to step 510. At step 510, the first box is driven to compression assembly 300. The next step, step 512, the major and minor panels of the first box are compressed and/or sealed together via compression assembly 300.

Again, referring to FIG. 20, in conjunction with FIGS. 1A-1C, method 500 may proceed to step 514. Step 514 comprises driving the first box to an embedding assembly 400. The next step, step 516, the second knock-down flat is driven to embedding assembly 400. At this step, the second KDF is opened via second KDF opening apparatus 415. Upon the opening of the second KDF, the second KDF becomes the second box. Finally, at step 518, the first box is nested into the second box via embedding assembly 400 forming a completed case assembly.

Moreover, referring to FIGS. 1A-1C, the method 500 may include additional steps preceding current step 502. In some embodiments, method 500 may include the step of dispensing a first knock-down flat onto a first conveyor via a knock-down flat dispenser 108. Additionally, in some embodiments, method 500 may further comprise and additional step of dispensing a second knock-down flat onto a second conveyor via a knock-down flat dispenser 108.

Additionally, in some alternative embodiments, step 518 of method 500 may comprise encasing the first box around the second box such that the second box is embedded into the first box via embedding assembly 400 forming a completed case assembly.

Glossary of Claim Terms

Assembly Frame means the foundational structure that supports the mechanical and electrical components of the case assembly system. It is designed to minimize vibrations during operation, ensuring precise alignment and reducing the risk of misassembly. The assembly frame is modular, allowing for adjustments and modifications to accommodate different configurations or upgrades. It is typically constructed from durable materials such as steel, aluminum, or composite alloys, ensuring long-term stability and resistance to operational wear. The frame provides mounting points for conveyors, dispensers, and assemblies, ensuring that all components operate in sync. Its elevated design allows for reduced contact with the ground, further minimizing vibrations and facilitating easy integration with external conveyor systems. The frame's rigidity and stability are critical for maintaining the precision required in automating the assembly of knock-down flats (KDFs) into case assemblies, especially in industrial environments where space constraints and operational efficiency are paramount.

Case Assembly means the final container formed by the automated embedding of a first knock-down flat (KDF) into a second KDF. This assembly process produces a half-slotted container (HSC) with reinforced vertical walls and a sealed bottom. The completed case assembly is designed for structural integrity and durability, ensuring that it can withstand the rigors of stacking, transportation, and storage. The process is automated to minimize errors and increase efficiency, enabling rapid and consistent production. The design accommodates various sizes and configurations, making it versatile for different industrial needs, such as packaging produce or fragile items. The completed case assembly optimizes material use while maintaining strength, making it cost-effective and suitable for high-volume applications.

Compression Assembly means a subsystem in the case assembly system that seals the folded panels of the first box, creating a secure bottom surface. It includes key components such as a compression drive system, compression cylinders, and a back plate apparatus. The compression drive system applies mechanical force to the inner surfaces of the minor panels, while the back plate presses against the major panels, ensuring a consistent and reliable seal. This assembly is essential for forming a stable foundation for the first box, providing the structural integrity necessary for embedding it into the second box. Adjustable compression force settings allow the system to accommodate different box sizes and materials. The compression assembly operates in sync with other subsystems, ensuring seamless transitions between stages and optimizing overall efficiency.

Compression cylinder means a component within the compression drive system that applies a controlled force to the minor panels of a box during the sealing process. The compression cylinder is operably coupled to a carriage, which moves along a guide track, ensuring precise alignment and engagement with the box. Upon making contact with the backstop, the compression cylinder undergoes a controlled collapse, creating a dwell and/or sealing time that allows the adhesive to set before retraction. The compression force is always less than the slide force, ensuring that the carriage movement synchronizes with the circular motion of a crank arm rather than causing abrupt disengagement. This controlled collapse ensures uniform pressure distribution and prevents over-compression, preserving box integrity. A home proximity switch regulates the retraction cycle, ensuring that the one or more compression cylinders and carriage return smoothly to their rest position between cycles.

Control Module means the central processing and control unit for the case assembly system. It integrates with sensors, motors, conveyors, and assemblies to coordinate the automated production of case assemblies. The control module allows operators to adjust settings such as production speed, individual assembly operations, and error-handling protocols. It can operate locally or remotely, enabling flexibility in monitoring and controlling the system. Advanced configurations may include machine learning algorithms that optimize efficiency by analyzing operational data and predicting potential errors or maintenance needs. This module ensures that each component of the assembly process functions in harmony, reducing downtime and increasing output.

Conveyors mean the transport systems that move knockdown flats (KDFs) and boxes through the various stages of assembly. They are equipped with friction-drive mechanisms that use multiple strands of round belts to ensure smooth, precise movement. The conveyors are configured to operate independently or in coordination, depending on the stage of assembly. Sensors placed along the conveyors communicate with the control module to monitor the position and movement of KDFs, activating stops or assemblies as needed. Reversible drive capabilities allow for error correction, enhancing the system's reliability. The conveyors are designed to handle various sizes and weights of KDFs, ensuring versatility and efficiency.

Embedding Assembly means the subsystem responsible for combining the first and second boxes into a final case assembly. It includes an embedding apparatus, corner guides, and stabilizers to ensure precise alignment and nesting. The embedding apparatus applies a controlled directional force to push one box into the other, while corner guides expand or stabilize the receiving box to facilitate smooth embedding. This assembly minimizes manual intervention, reduces errors, and ensures consistent output. The embedding process enhances the structural integrity of the final product by ensuring a secure fit between the embedded components. Adjustable settings allow the system to accommodate different box sizes and configurations.

Embedding Apparatus means the primary device within the embedding assembly that pushes the first box into the second box. It is mounted on a carriage that moves along a track, ensuring precise alignment and controlled movement. The apparatus uses directional force to embed the boxes without damaging them, guided by sensors and corner guides. Its design allows for adjustments in force and speed, accommodating various box materials and dimensions. By automating this process, the embedding apparatus significantly increases efficiency and consistency, eliminating the variability associated with manual operations.

Embedding Stabilizer means a mechanism that ensures the second box remains stationary and aligned during the embedding process. It applies counterforces to prevent movement or misalignment caused by the embedding apparatus. The stabilizer includes components such as plates or guides that press against the box, maintaining its position while the first box is embedded. This ensures that the final case assembly is properly aligned and securely nested. The stabilizer's design accommodates various box sizes and materials, making it a versatile component of the embedding assembly.

Friction Drive Conveyor System means a type of conveyor technology that uses multiple strands of round belts to move KDFs and boxes through the assembly process. This system provides consistent traction and alignment, even for irregularly shaped or lightweight components. The conveyors can reverse direction to correct errors, ensuring smooth operation and reducing downtime. The friction drive system allows precise movement required for automated assembly, enabling accurate positioning of components at each stage.

Glue Applicator means a device in the opening and folding assembly that applies adhesive to the minor panels of the first box. It uses spray or contact methods to deposit a controlled amount of glue, preparing the panels for sealing in the compression assembly. The glue applicator ensures consistent coverage, reducing the risk of weak seals or misaligned panels. Adjustable settings allow for customization based on the box material and adhesive type, enhancing the system's versatility.

Knock-Down Flat (KDF) means a flat, folded configuration of corrugated material designed for efficient storage and transport. KDFs are pre-scored and folded to simplify their transformation into three-dimensional boxes during assembly. They include major and minor panels that form the box's sides and edges. KDFs are a cost-effective and space-saving solution widely used in packaging applications.

Major Panels mean the larger panels of a KDF that form the top and bottom surfaces of the box. These panels provide structural support and are folded and sealed during the assembly process. Their size and material strength are critical for ensuring the box's durability and load-bearing capacity.

Minor Panels mean the smaller panels of a KDF that form the edges of the box. They are folded inward and glued to the major panels to create a secure, stable structure. Minor panels play a key role in the box's overall integrity and are an essential part of the assembly process.

Opening and Folding Assembly means a subsystem that transforms a flat KDF into a three-dimensional box. It includes devices such as vacuum cups, panel folders, and glue applicators that open, fold, and prepare the panels for sealing. The assembly operates in a coordinated sequence, ensuring precise alignment and consistent output.

Panel Folding Apparatus means devices within the opening and folding assembly that fold the minor and major panels of the box. They use mechanical or pneumatic actuators to apply precise force, ensuring accurate folds without damaging the material. These apparatuses are essential for creating a properly aligned box ready for sealing.

Pressure Pads mean components of the compression assembly that apply mechanical force to the minor panels of the first box. They are connected to compression cylinders and ensure consistent pressure during the sealing process, forming a strong bond between panels.

Stop Mechanism means devices that temporarily halt the movement of KDFs or boxes on conveyors during assembly. Stops ensure precise alignment and allow subsystems to complete their operations without interference. They are activated by sensors and controlled by the central module.

Top Corner Guide means a component of the embedding assembly that rotates into the top corners of the second box to guide the first box during embedding. It expands the opening of the second box, facilitating smooth and accurate nesting of the boxes.

Vacuum Cup means a device used to lift and manipulate KDFs during the opening process. It creates a vacuum seal with the KDF's surface, ensuring secure handling and precise positioning. Vacuum cups are critical for transforming flat KDFs into three-dimensional boxes.

What is claimed is:

1. A compression assembly for sealing a box, the compression assembly comprising:

a. a compression drive system configured to apply a force against at least one minor panel of a box;

b. a back plate apparatus configured to apply a counter-force against at least one major panel of the box;

c. two parallel conveyors in which a box traveling along one of the conveyors is aligned between the compression drive system and the back plate apparatus for compression sealing;

d. a plurality of stops being mechanically coupled to one of the two conveyors, vertically offset from one of the two conveyors, or both;

e. a compression roller vertically offset above the center-line of one of the two conveyors configured to apply a pulling frictional force against a top surface of a box;

f. the plurality of stops, compression roller, and one of the two conveyors being configured to position a box so that a leading minor panel is at a 90-degree angle to a lower major panel of the box;

g. wherein the compression drive system is configured to press against at least one portion of an inner surface of at least one minor flap of a box;

h. wherein a back plate of the back plate apparatus is configured to simultaneously press against at least one portion of an outer surface of at least one major flap of a box; and i. wherein the compression drive system and the back plate apparatus are positioned on opposite sides of a conveyor friction drive system.

2. The compression assembly of claim 1, wherein the compression drive system further comprises:

a. a frame;

b. a motor mechanically coupled to a top surface of the frame;

c. a compression drive crank operably coupled to the motor;

d. a crank arm, having a retracted position, mechanically coupled to the compression drive crank;

e. a guide track mechanically coupled to the frame wherein the guide track is disposed in the middle of the frame;

f. a carriage operably coupled to the crank arm wherein the carriage is operably coupled to the guide track, allowing the carriage to translate along the guide track;

g. one or more compression cylinders mechanically coupled to the carriage;

h. one or more pressure pads mechanically coupled to the compression cylinders;

i. a home proximity switch communicatively coupled to the motor configured to define a retracted position of the crank arm; and j. wherein the home proximity switch is configured to deactivate the motor before the crank arm reaches its retracted position, allowing the crank arm to glide back into the retracted position.

3. The compression assembly of claim 2, wherein the crank arm further comprises a length ranging from about 5 inches to about 16 inches.

4. The compression assembly of claim 2, wherein the one or more pressure pads further comprise a diameter ranging from about 2 inches to about 8 inches.

5. The compression assembly of claim 2, further comprising a magnet mechanically coupled to the frame wherein the magnet is positioned to magnetically couple to the crank arm to magnetically pull the crank arm and hold the crank arm at the retracted position between cycles.

6. The compression assembly of claim 1, A wherein the back plate apparatus further comprises:

a. a pneumatic slide;

b. the back plate operably coupled to the pneumatic slide; and c. wherein the back plate is configured to extend outward by the pneumatic slide when activated.

7. The compression assembly of claim 1, wherein the two conveyors further comprise multiple strands of round belts configured to apply a constant pulling frictional force against the bottom of the box.

* * * * *